(12) United States Patent
Kanazawa et al.

(10) Patent No.: US 12,743,755 B2
(45) Date of Patent: Sep. 22, 2026

(54) GUIDED CONTEXTUAL ATTENTION MAP FOR INPAINTING TASKS

(71) Applicant: Google LLC, Mountain View, CA (US)

(72) Inventors: Noritsugu Kanazawa, Campbell, CA (US); Neal Wadhwa, Cambridge, MA (US); Yael Pritch Knaan, Mountain View, CA (US); Kfir Aberman, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 266 days.

(21) Appl. No.: 18/580,507

(22) PCT Filed: Jul. 19, 2021

(86) PCT No.: PCT/US2021/042150

§ 371 (c)(1),
(2) Date: Jan. 18, 2024

(87) PCT Pub. No.: WO2023/003528

PCT Pub. Date: Jan. 26, 2023

(65) Prior Publication Data

US 2025/0086760 A1 Mar. 13, 2025

(51) Int. Cl.
*G06T 5/77* (2024.01)
*G06T 5/60* (2024.01)

(52) U.S. Cl.
CPC .................. *G06T 5/77* (2024.01); *G06T 5/60* (2024.01); *G06T 2207/20081* (2013.01); *G06T 2207/20084* (2013.01)

(58) Field of Classification Search
CPC ... G06T 5/77; G06T 5/60; G06T 2207/20081; G06T 2207/20084
See application file for complete search history.

(56) References Cited

U.S. PATENT DOCUMENTS

| | | | | |
|---|---|---|---|---|
| 2018/0108137 A1* | 4/2018 | Price | ........................ | G06N 3/08 |
| 2018/0239867 A1* | 8/2018 | Kopylov | ................ | G06V 10/44 |

(Continued)

FOREIGN PATENT DOCUMENTS

| | | |
|---|---|---|
| JP | 2014142836 | 8/2014 |
| JP | 2017058930 | 3/2017 |

OTHER PUBLICATIONS

Liu et al., "Coherent Semantic Attention for Image Inpainting", 2019 IEEE/CVF International Conference on Computer Vision (ICCV) (Year: 2019).*

(Continued)

*Primary Examiner* — Qian Yang
(74) *Attorney, Agent, or Firm* — DORITY & MANNING P.A.

(57) ABSTRACT

Systems and methods for augmenting data can leverage one or more machine-learned models and contextual attention data to provide more realistic and efficient data augmentation. For example, systems and methods for inpainting can leverage a machine-learned model to generate predicted contextual attention data and blend the predicted contextual attention data with obtained contextual attention data to determine replacement data for augmenting an image to replace one or more occlusions. The obtained contextual attention data can include user-guided contextual attention.

7 Claims, 14 Drawing Sheets

(56) References Cited

U.S. PATENT DOCUMENTS

| | | | | |
|---|---|---|---|---|
| 2019/0238568 | A1* | 8/2019 | Goswami | H04L 63/1416 |
| 2021/0217145 | A1 | 7/2021 | El-Khamy et al. | |

OTHER PUBLICATIONS

Lizuka et al., "Globally and locally consistent image completion", ACM Transactions on Graphics (TOG), vol. 36, Issue 4 (Aug. 2017) (Year: 2017).*

Takahashi et al., "RICAP: Random Image Cropping and Patching Data Augmentation for Deep CNNs", Proceedings of Machine Learning Research 95:786-798, 2018 (Year: 2018).*

Cun et al, "Improving the Harmony of the Composite Image by Spatial-Separated Attention Module", IEEE Transactions on Image Processing, vol. 29, 2020 (Year: 2020).*

Zhao et al. "Guided Image Inpainting: Replacing an Image Region by Pulling Content from Another Image", 2019 IEEE Winter Conference on Applications of Computer Vision (Year: 2019).*

Hirahara et al., "Noise Removal and Defect Restoration for Sea Surface Temperature Images Using Adversarial Physics Model Loss", The Institute of Electronics, Information and Communication Engineers, IEICE Technical Report, 2019, 7 pages.

Yu et al., "Free-Form Image Inpainting with Gated Convolution", IEEE/CVF International Conference on Computer Vision (ICCV), 2019, 10 pages.

International Preliminary Report on Patentability for Application No. PCT/US2021/042150, mailed Feb. 1, 2024, 12 pages.

github.com, "JiahuiYu/generative_inpainting", https://github.com/Jiahui Yu/generative_inpainting, retrieved on Jan. 18, 2024, 3 pages.

International Search Report for PCT/US2021/042150, mailed on Jun. 13, 2022, 4 pages.

Mohite et al., "Image Inpainting with Contextual Attention and Partial Convolution", 2020 International Conference on Artificial Intelligence and Signal Processing (AISP), Jan. 10-12, 2020, Amaravati, India, 6 pages.

Xiao et al., "Generative Image Inpainting by Hybrid Contextual Attention Network", MultiMedia Modeling: 27th International Conference, Jun. 22-24, 2021, Prague, Czech Republic, pp. 162-173.

Xu et al., "Deep Flow-Guided Video Inpainting" arXiv:1905.02884v1, May 8, 2019, 10 pages.

Yu et al., "Generative Image Inpainting with Contextual Attention", arXiv:1801.07892v2, Mar. 21, 2018, 15 pages.

Zhang et al., "Text-Guided Neural Image Inpainting", arXiv:2004.03212v4, Mar. 22, 2021, 9 pages.

Zhao et al., "Guided Image Inpainting: Replacing an Image Region by Pulling Content from Another Image", arXiv: 1803.08435v1, Mar. 22, 2018, 28 pages.

* cited by examiner

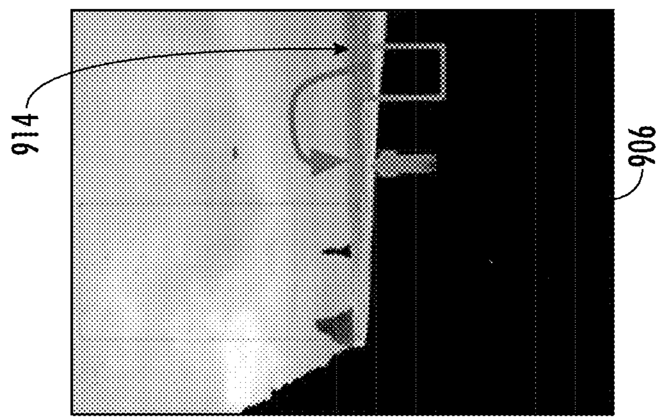
914
906
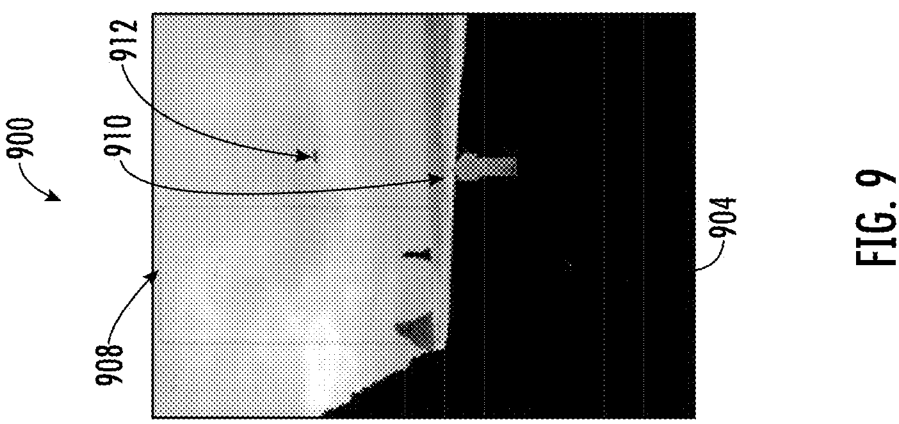
900
912
910
908
904
FIG. 9
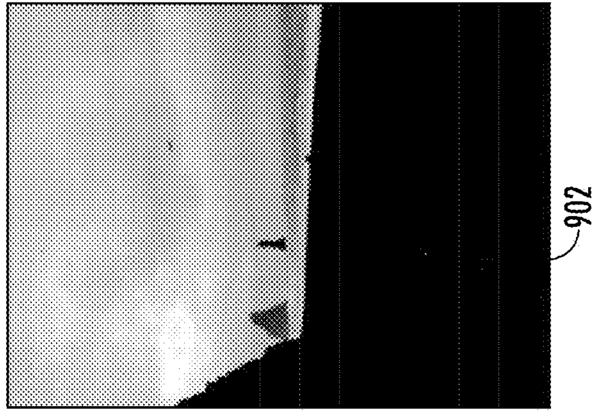
902

GUIDED CONTEXTUAL ATTENTION MAP FOR INPAINTING TASKS

RELATED APPLICATIONS

The present application is based on and claims priority under 35 U.S.C. § 371 to International Application No. PCT/US2021/042150 filed on Jul. 19, 2021, which is incorporated by reference herein.

FIELD

The present disclosure relates generally to processing image data. More particularly, the present disclosure relates to a machine-learned model for high quality image inpainting that can combine contextual attention with user guidance for improved inpainting.

BACKGROUND

Images (e.g., photographs) and other forms of data often include unwanted data. As one example, the unwanted data could correspond to artifacts arising from processing an image to reduce noise in the image. As another example the unwanted data could correspond to a human person in the foreground of a landscape or an unknown person in the background of a family photo. As another example, the unwanted data could correspond to an unsightly object in an otherwise pristine background.

Thus, unwanted data can correspond to objects which occlude or obscure other portions of an image, such as a depicted scene. However, replacing the unwanted data with replacement data (e.g., replacement image data that depicts the occluded portion of the image that is occluded by the unwanted data, a process also known as "inpainting") is a challenging problem which is non-deterministic in nature. Stated differently, multiple possible solutions could be determined from the same image, resulting in a difficult problem.

Some current systems and methods include a "Clone Tool" that enables the users to select the source location of the copied pixels to inpaint the area they want to remove. On the other hand, solutions suggested in papers written by the machine-learning and computer vision community include Contextual Attention Map, a component which tries to predict the source locations of the pixels using machine learning. However, both techniques have their own deficiencies.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training an inpainting model. The method can include receiving, by a computing system including one or more processors, an input image and a ground truth image. In some implementations, the ground truth image can depict a scene, and the input image can depict the scene with one or more occlusions. The method can include processing, by the computing system, the ground truth image with a contextual attention model to generate a contextual attention output. The method can include processing, by the computing system, the input image and the contextual attention output with an augmentation model to generate a prediction image. The method can include evaluating, by the computing system, a loss function that evaluates a difference between the prediction image and the ground truth image. In some implementations, the method can include adjusting, by the computing system, one or more parameters of the augmentation model based at least in part on the loss function.

In some implementations, the augmentation model can include a prediction model, a blend model, and an occlusion model. The method can include processing the input image and the contextual attention output with the augmentation model including: processing, by the computing system, the input image with the prediction model to generate predicted contextual attention data; processing, by the computing system, the predicted contextual attention data and the contextual attention output with a blend model to generate blended data; and processing, by the computing system, the blended data and the input image to generate the prediction image. In some implementations, the blend model can be trained to randomly blend the predicted contextual attention data and the contextual attention output. The input image can be generated by adding one or more occlusions to the ground truth image. In some implementations, the contextual attention model can include a convolutional neural network and one or more contextual attention blocks. The contextual attention model can be trained by: processing, by the computing system, one or more training images with the contextual attention model to generate training contextual attention outputs; processing, by the computing system, the training contextual attention outputs with an inpainting model to generate a training augmented image; evaluating, by the computing system, a training loss function that evaluates a difference between the training augmented image and the ground truth image; and adjusting, by the computing system, one or more contextual attention parameters of the contextual attention model based at least in part on the training loss function. In some implementations, the one or more occlusions can include one or more humans. The method can include receiving, by the computing system, one or more inputs descriptive of a selection of a portion of the input image. In some implementations, the prediction image can be generated based at least in part on the one or more inputs.

Another example aspect of the present disclosure is directed to a computing system for inpainting. The computing system can include one or more processors and one or more non-transitory computer-readable media that collectively store instructions that, when executed by the one or more processors, cause the computing system to perform operations. The operations can include obtaining an input image. In some implementations, the input image can include one or more objects for replacement. The operations can include obtaining one or more user-inputs. In some implementations, the one or more user-inputs can include one or more contextual attention inputs. The operations can include processing the input image and the one or more user-inputs with an augmentation model to generate an augmented image. In some implementations, the augmentation model can be trained to replace the one or more objects via ground truth training. The operations can include providing the augmented image to a user.

In some implementations, the operations can include obtaining one or more second user-inputs, in which the one or more second user-inputs can be descriptive of a selection of a portion of the input image. In some implementations, the augmented image can be generated based at least in part on the one or more second user-inputs. The augmentation model can include a blend model trained to blend predicted contextual attention data and user-inputted contextual attention data. In some implementations, the predicted contextual attention data can be generated based at least in part on the input image, and the user-inputted contextual attention data can be based at least in part on the one or more user-inputs. The predicted contextual attention data and the user-inputted contextual attention data can be blended based at least in part on a blending weight, and the blending weight can be manually-controlled by a user. In some implementations, the predicted contextual attention data and the user-inputted contextual attention data can be blended based at least in part on a blending weight, and the blending weight can be adjusted during the ground truth training. The computing system can include a visual display for displaying the augmented image. In some implementations, the operations can include providing the input image for display to provide a visual interface for the user. The one or more user-inputs can be obtained with a touch screen display. The operations can include providing a representation of the one or more user-inputs overlayed over the input image.

Another example aspect of the present disclosure is directed to one or more non-transitory computer readable media that collectively store instructions that, when executed by one or more processors, cause a computing system to perform operations. The operations can include receiving input data from a user. In some implementations, the input data can include one or more images. The operations can include obtaining contextual attention data. In some implementations, the contextual attention data can include selected pixel data. The operations can include processing the input data with a prediction model to generate predicted contextual attention data. The operations can include processing the contextual attention data and the predicted contextual attention data with a blend model to generate blended data. The operations can include processing the input data and the blended data with an occlusion model to replace one or more pixels from the one or more images.

In some implementations, the one or more images can be frames of a video, and an output of the occlusion model can be an augmented video output. The occlusion model can be trained with a perceptual loss function. The operations can include adding the one or more pixels back into the one or more images to generate a rendered image. In some implementations, the contextual attention data can include a flattened input tensor. The contextual attention data can be generated based at least in part on a lasso gesture input by a user.

Another example aspect of the present disclosure is directed to a computer-implemented method for training an augmentation model. The method can include receiving, by a computing system including one or more processors, an input image and a ground truth image. In some implementations, the ground truth image can depict a scene, and the input image can depict the scene with one or more occlusions. The method can include processing, by the computing system, the ground truth image with a contextual attention model to generate a contextual attention output. The method can include processing, by the computing system, the input image and the contextual attention output with the augmentation model to generate a prediction image. The method can include evaluating, by the computing system, a loss function that evaluates a difference between the prediction image and the ground truth image and adjusting, by the computing system, one or more parameters of the augmentation model based at least in part on the loss function.

In some implementations, the augmentation model can include a prediction model, a blend model, and an occlusion model. The operations can include processing the input image and the contextual attention output with the augmentation model including: processing, by the computing system, the input image with the prediction model to generate predicted contextual attention data; processing, by the computing system, the predicted contextual attention data and the contextual attention output with the blend model to generate blended data; and processing, by the computing system, the blended data and the input image with the occlusion model to generate the prediction image. In some implementations, the blend model can be trained to randomly blend the predicted contextual attention data and the contextual attention output. The occlusion model can be trained with a perceptual loss function. The input image can be generated by adding one or more occlusions to the ground truth image. In some implementations, the contextual attention model can include a convolutional neural network and one or more contextual attention blocks. The contextual attention model can be trained by: processing, by the computing system, one or more training images with the contextual attention model to generate training contextual attention outputs; processing, by the computing system, the training contextual attention outputs with an inpainting model to generate a training augmented image; evaluating, by the computing system, a training loss function that evaluates a difference between the training augmented image and the ground truth image; and adjusting, by the computing system, one or more contextual attention parameters of the contextual attention model based at least in part on the training loss function. In some implementations, the one or more occlusions can include one or more humans.

In some implementations, the method can include receiving, by the computing system, one or more inputs descriptive of a selection of a portion of the input image, and the prediction image can be generated based at least in part on the one or more inputs.

Another example aspect of the present disclosure is directed to a computer-implemented method. The method can include obtaining an input image. The input image can include one or more objects for replacement. The method can include obtaining one or more contextual attention inputs. The method can include processing the input image and the one or more contextual attention inputs with an augmentation model to generate an augmented image. In some implementations, the augmentation model can be trained to replace the one or more objects via ground truth training. The method can include providing the augmented image to a user.

In some implementations, the augmentation model can be trained using the computer-implemented method. The one or more context attention inputs can be user-inputs. The one or more user-inputs can be obtained with a touchscreen display. The method can include providing a representation of the one or more user-inputs overlayed over the input image. In some implementations, the contextual attention data can be generated based at least in part on a lasso gesture input by a user. The method can include obtaining one or more second user-inputs. In some implementations, the one or more second user-inputs can be descriptive of a selection of a portion of the input image, and the augmented image can be generated based at least in part on the one or more second user-inputs. The augmentation model can include a blend model trained to blend predicted contextual attention data and user-inputted contextual attention data, the predicted contextual attention data can be generated based at least in part on the input image, and the user-inputted contextual attention data can be based at least in part on the one or more user-inputs. In some implementations, the predicted contextual attention data and the user-inputted contextual attention data can be blended based at least in part on a blending weight, and the blending weight can be manually-controlled by a user.

In some implementations, the predicted contextual attention data and the user-inputted contextual attention data can be blended based at least in part on a blending weight, and the blending weight can be adjusted during the ground truth training. The method can include providing the input image for display to provide a visual interface for the user. The input image can be a frame of a video, and an output of the augmentation model can be an augmented video output. In some implementations, the contextual attention input can include a flattened input tensor.

In some implementations, one or more non-transitory computer readable media that collectively store instructions that, when executed by one or more processors, cause a computing system to perform the computer-implemented method.

In some implementations, a computing system can include one or more processors and one or more non-transitory computer readable media that collectively store instructions that, when executed by one or more processors, cause a computing system to perform the computer-implemented method.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 9 depicts an illustration of an example inpainting process according to example embodiments of the present disclosure.

Figure 1A:
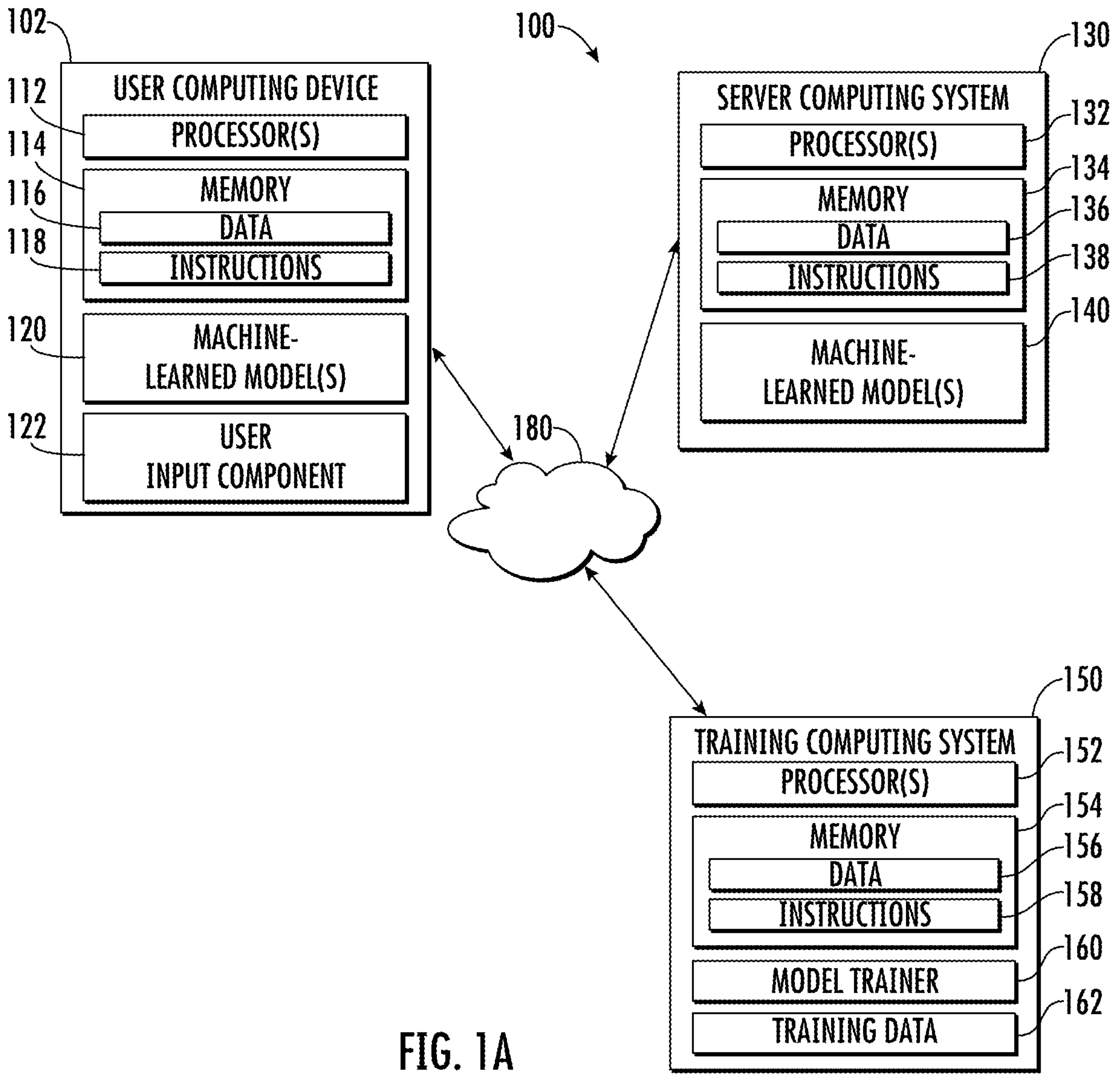
FIG. 1A depicts a block diagram of an example computing system that performs image augmentation according to example embodiments of the present disclosure.

Reference numerals that are repeated across plural figures are intended to identify the same features in various implementations.

DETAILED DESCRIPTION

Overview

Generally, the present disclosure is directed to leveraging machine-learned models for inpainting. Images can often have one or more occlusions that a user wishes to remove or replace with predicted pixels. For example, photographs taken at landmarks can include signs, people, and other objects the user wishes to remove. Systems and methods disclosed herein can be leveraged to remove one or more unwanted objects from an image. The systems and methods can obtain input data and contextual attention data. The input data can include one or more images with one or more objects for cloning or removal, and the contextual attention data can include data descriptive of objects to remove and/or areas of an image to clone. The input data and the contextual attention data can then be processed by an augmentation model to generate an augmented image. The augmented image can comprise features from the one or more images of the input data but may include cloned portions of the input image in place of the one or more objects for removal.

The systems and methods disclosed herein can leverage one or more machine-learned models to predict occluded data and replace the occlusions with predicted data to generate augmented data. In some implementations, the one or more machine-learned models can be trained with ground truth training. Systems and methods for training an inpainting model can include receiving input data and ground truth data. The ground truth data can include un-occluded data, and the input data may include data with one or more occlusions. The input data may be generated by adding occlusions to the ground truth data. The ground truth data can be processed with a contextual attention model to generate a contextual attention output. The input data and the contextual attention output can then be processed with an augmentation model to generate prediction data. The prediction data can include data with the one or more occlusion replaced by predicted replacement data. The prediction data and the ground truth data can then be compared in order to evaluate a loss function. Based on the evaluation, one or more parameters of the augmentation model may be adjusted. The process may be repeated iteratively in order to train the augmentation model to accurately inpaint occluded data.

The trained model can then be used for a variety of inpainting tasks. The systems and methods disclosed herein can be used for augmenting a variety of data types including image data, audio data, and/or three-dimensional point cloud data. Systems and methods for inpainting with one or more machine-learned models can include obtaining input data in which the input data includes one or more occlusions for removal. The systems and methods can further include obtaining one or more user-inputs. The one or more user inputs can include one or more contextual attention inputs and may include one or more selections of portions of the input data to clone. The input data and the one or more user-inputs can be processed with an augmentation model to generate augmented data. The augmented data can include replacement data in place of the one or more occlusions. The systems and methods can further include providing the augmented data to a user.

In some implementations, the systems and methods can be utilized for image inpainting. For example, a user may wish to replace one or more objects in an image with predicted data in order to remove unwanted people, trash, buildings, etc. Utilization of the systems and methods for image inpainting can include receiving input data from a user, in which the input data includes one or more images. Contextual attention data can also be obtained. The contextual attention data can include selected pixel data in which the selected pixel data includes pixels in the input image. The input data can be processed with a prediction model to generate predicted contextual attention data. The predicted contextual attention data and the contextual attention data can be processed with a blend model to generate blended data. The blended data and the input image can then be processed with an occlusion model to generate an augmented image. The augmented image can include the input image with the one or more occlusions replaced with predicted data.

Training the machine-learned models can involve receiving or obtaining input data and ground truth data. The input data and the ground truth data can include an input image and a ground truth image respectively. The ground truth image can depict a scene, and the input image can depict the scene with one or more occlusions. In some implementations, the input image can be generated by adding the occlusions to the ground truth image. Training the one or more machine-learned models can include obtaining a plurality of training sets, in which each training set includes input data and ground truth data. Alternatively and/or additionally, the input data and the ground truth data can include audio data, in which a portion of the audio data for the input data is occluded compared to the ground truth data. The occlusions can be humans, animals, buildings, and/or image capture created occlusions. In some implementations, the data can be audio data, and the occlusions can be errant sounds, equipment generated noise, white, noise, etc.

The ground truth data can be processed with a contextual attention model to generate a contextual attention output. The contextual attention model can include one or more contextual attention sub-blocks. In some implementations, the contextual attention model can include a feed-forward, fully convolutional neural network. The contextual attention model can include one or more softmax sub-blocks.

In some implementations, the contextual attention model can be trained by processing one or more training images with the contextual attention model to generate training contextual attention outputs. The training contextual attention outputs can be processed with an inpainting model to generate a training augmented image. A difference between the training augmented image and the ground truth image can then be used to evaluate a training loss function. The training loss function evaluation can then be used to adjust one or more contextual attention parameters of the contextual attention model.

The contextual attention data can include a portion of the ground truth image data generated by processing a ground truth image with a contextual attention sub-block and a convolutional neural network. Alternatively and/or additionally, the contextual attention data can include user input data that comprises one or more selections of portions of the input image to clone.

The input data and the contextual attention output can be processed with an augmentation model to generate prediction data. Prediction data can include augmented image data that replaces the one or more occlusions with predicted replacement data.

In some implementations, the augmentation model can include a prediction model, a blend model, and an occlusion model. The prediction model can process the input data to generate a contextual attention prediction. The blend model can process the predicted contextual attention data and the contextual attention output to generate blended data. The blended data can then be processed with the input data to generate the predicted image which includes the occlusion objects being replaced by cloned data.

The blend model can be trained to randomly blend the predicted contextual attention data and the contextual output data. The contextual attention data can be data generated based on user-inputs or may be automatically generated based on one or more data sets.

The prediction data and the ground truth data can then be compared in order to evaluate a loss function. The loss function may be a perceptual loss function. Alternatively, the loss function may be a Kullback-Leibler (KL) divergence loss function, a VGG loss function, or a GAN loss function. The loss function can then be used to adjust one or more parameters of the augmentation model. In some implementations, one or more parameters of at least one of the prediction model and the blend model may be adjusted in response to the loss function being evaluated.

A computing system that utilizes one or more machine-learned models to inpaint can include one or more processors and one or more non-transitory computer-readable media that collectively store instructions that, when executed by the one or more processors, cause the computing system to perform operations. The operations can include methods for inpainting.

The systems and methods can include obtaining input data. The input data can include one or more input images. The input image can include one or more objects for removal. The objects can be occlusions occluding one or more portions of the scene depicted in the image. The occlusions can include image imperfections, unwanted humans or objects captured in the image, and/or previously placed occlusions.

One or more user-inputs can then be obtained. The one or more user inputs can include one or more contextual attention inputs. For example, in some implementations, the one or more user-inputs can include selections of at least one of the occlusions or portions of an image that includes pixels the user wishes to clone.

In some implementations, the first user-input can include one or more selections of occlusions for replacement. The systems and methods can then obtain one or more second user-inputs. The one or more second user-inputs can include one or more selections of portions of the input data to clone for replacing the one or more occlusions.

The input data and the one or more user-inputs can be processed with an augmentation model to generate augmented data. The augmentation model can be trained to remove and replace the one or more objects via ground truth training. In some implementations, the augmentation model generates a predicted contextual attention output, blends the predicted contextual attention output with user-selected portions of the input data, and generates the augmented data with the blended data and the input data. The blending weight can be randomly chosen, automatically determined, or manually selected. In some implementations, the blending weight may be manually adjusted by a user via one or more inputs into a user interface. The blending weight can be preselected or may be chosen via a slide-scale feature, such that a user can view a variety of possible options based on the blending weight. Alternatively and/or additionally, the blending weight may be machine-learned. For example, in some implementations, the blending weight may be determined and adjusted based on the ground truth training and/or retrained by reinforcement training. The blending weight may be adjusted based on previous user interactions, such that the blend model is adjusted to be tailored towards user preferences. The blending can include semantically blending the data. In some implementations, the blending can involve attention pooling.

The augmented data can then be provided to a user. The augmented data can include an augmented image in which portions of the input image are replaced with predicted data to replace one or more objects in the input image. The augmented image can be provided via a visual display, in which the visual display is part of a computing device. In some implementations the computing device can be a mobile computing device.

In some implementations, the systems and methods disclosed herein can be implemented into a mobile computing device. For example, the input data can be obtained from one or more sensors stored in the mobile computing device (e.g., image data obtained with one or more image sensors, audio data obtained with one or more audio sensors, etc.). The one or more user-inputs can be one or more touch inputs on a touchscreen display, and the augmented data can be provided via one or more output components in the mobile computing device (e.g., an augmented image displayed on a visual display, augmented audio played over one or more speakers, etc.).

In some implementations, the systems and methods disclosed herein can be provided via a user interface. For example, the user interface can include one or more visual interface features. More specifically, the input data can include an image, which can be provided for display. The user interface can then allow for the user to select one or more portions of the image to select for replacement. The user interface may also allow a user to select one or more portions of the image to clone in order to replace the one or more previously selected portions. The input image and the user-inputs can then be processed to generate the augmented image, which is then provided for display via the visual interface.

Moreover, in some implementations, when a user-input is provided, one or more representations may be displayed over the input image. For example, in response to an occlusion being selected for removal, a silhouette of the occlusion may be displayed overlayed over the input image to provide visual feedback of what was selected. The silhouette may be colored in one or more colors, may be opaque or partially transparent, and/or may be labeled. Alternatively and/or additionally, the user-inputs may be displayed similarly to painting over the input image such that the first user-inputs and/or the second user-inputs may be displayed similarly to a brush tool response in a painting application. The first user-inputs and the second user-inputs may be displayed in differing colors or styles.

In some implementations, the systems and methods disclosed herein can be used to move objects in an image and may be used to generate videos of an object moving throughout a scene. For example, the user may select one or more objects to segment and move to a different portion of the image. The portion of the image originally including the one or more objects can then be inpainted using the systems and methods disclosed herein. These systems and methods can also be used for resizing the objects in the image, and inpainting the now augmented portions of the image.

The one or more objects, or occlusions, can be selected by autorecognition, a lasso gesture, a manual brush input, or via a variety of other selection techniques. In some implementations, the lasso gesture can be aided by object recognition processes. Autorecognition can involve training one or more machine-learned models to identify the foreground and background of images. The one or more machine-learned models may be trained to further determine people or objects of interest. The one or more machine-learned models may also learn from past user interactions, which objects or features a user often selects for removal (e.g., trash cans, logos, image or facial imperfections, etc.). The one or more machine-learned models may also be trained to learn which people and objects are acceptable for maintaining in future input images.

In some implementations, the systems and methods disclosed herein can include flattening an input tensor, processing the flattened input tensor with a contextual attention matrix to generate a transformed input, and the transformed input can then be deflattened to generate an output tensor.

The contextual attention model and the augmentation model may be trained simultaneously or separately. In some implementations, the contextual attention model can be trained before training the augmentation model.

In some implementations, the augmentation model can utilize input mask targets for augmentation. Additionally and/or alternatively, the systems and methods disclosed herein may utilize image segmentation masks for segmenting portions of images for image inpainting tasks.

The systems and methods of the present disclosure provide a number of technical effects and benefits. As one example, the inpainting machine-learning system can aid in computing performance by refining parameters of the predictions completed for the creation of the replacement data. Thus, the performed inpainting can be higher quality (e.g., more accurate) than previous techniques, which represents an improvement in the performance of a computing system. Further, the proposed approaches may eliminate the need to create such a large spectrum of predictions to be evaluated, which is required by certain existing techniques. Eliminating the need to create a large number of different predictions can result in savings of computing resources such as processor usage, memory usage, and/or network bandwidth usage. The use of ground truth data also removes some confusion from the training and makes the training more efficient, thereby conserving computing resources. The trained system may reduce the amount of computing resources utilized versus previous systems.

As the implementation of machine learning also eliminates the need to manually edit every occurrence of unwanted data in an image, more efficiency may be added. The system may also eliminate the need for a coder to write a long drawn out code, run the code, refine the code, and continually supervise performance.

Further, the system and method described herein may be used in any process in which an image is used as an input to a system, to provide higher quality input images to the system. Non-limiting examples of possible applications include: medical images, such as X-ray images or a scan image of a patient; monitoring the condition of an item of machinery, where images of the item of machinery are acquired regularly and are used to determine when a component is likely to require repair or replacement; and an autonomous vehicle that makes decisions on its course and speed based on images that it acquires of its surrounding.

The lightened computational cost of the systems and methods disclosed herein can allow for the systems and methods disclosed herein to be used with a mobile computing device to allow for image inpainting to be completed in the palm of a user's hand.

With reference now to the Figures, example embodiments of the present disclosure will be discussed in further detail.

Example Devices and Systems

FIG. 1A depicts a block diagram of an example computing system 100 that performs data augmentation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more augmentation models 120. For example, the augmentation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example augmentation models 120 are discussed with reference to FIGS. 2-5.

In some implementations, the one or more augmentation models 120 can be received from the server computing system 130 over network 180, stored in the user computing device memory 114, and then used or otherwise implemented by the one or more processors 112. In some implementations, the user computing device 102 can implement multiple parallel instances of a single augmentation model 120 (e.g., to perform parallel data augmentation across multiple instances of occlusions).

More particularly, the systems and methods disclosed herein can obtain input data and contextual attention data, which can then be processed with an augmentation model to generate augmented data (e.g., an image can be augmented to remove one or more occlusions). The augmentation model can be trained with ground truth training and may include a prediction model and a blend model. The prediction model can process the input data to generate predicted contextual attention data. The blend model can then process the predicted contextual attention data and the obtained contextual attention data to generate blended data. The blend data and the input data may then be processed with an occlusion model included in the augmentation model to generate augmented data that includes replacement data instead of the one or more occlusions.

Additionally or alternatively, one or more augmentation models 140 can be included in or otherwise stored and implemented by the server computing system 130 that communicates with the user computing device 102 according to a client-server relationship. For example, the augmentation models 140 can be implemented by the server computing system 140 as a portion of a web service (e.g., an inpainting service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned augmentation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the augmentation models 120 and/or 140 based on a set of training data 162. The training data 162 can include, for example, can include training data sets that include input data and ground truth data. In some implementations, the input data can be generated by adding one or more occlusions to the ground truth data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image segmentation output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output.

In some implementations, the input to the machine-learned model(s) of the present disclosure can be speech data. The machine-learned model(s) can process the speech data to generate an output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
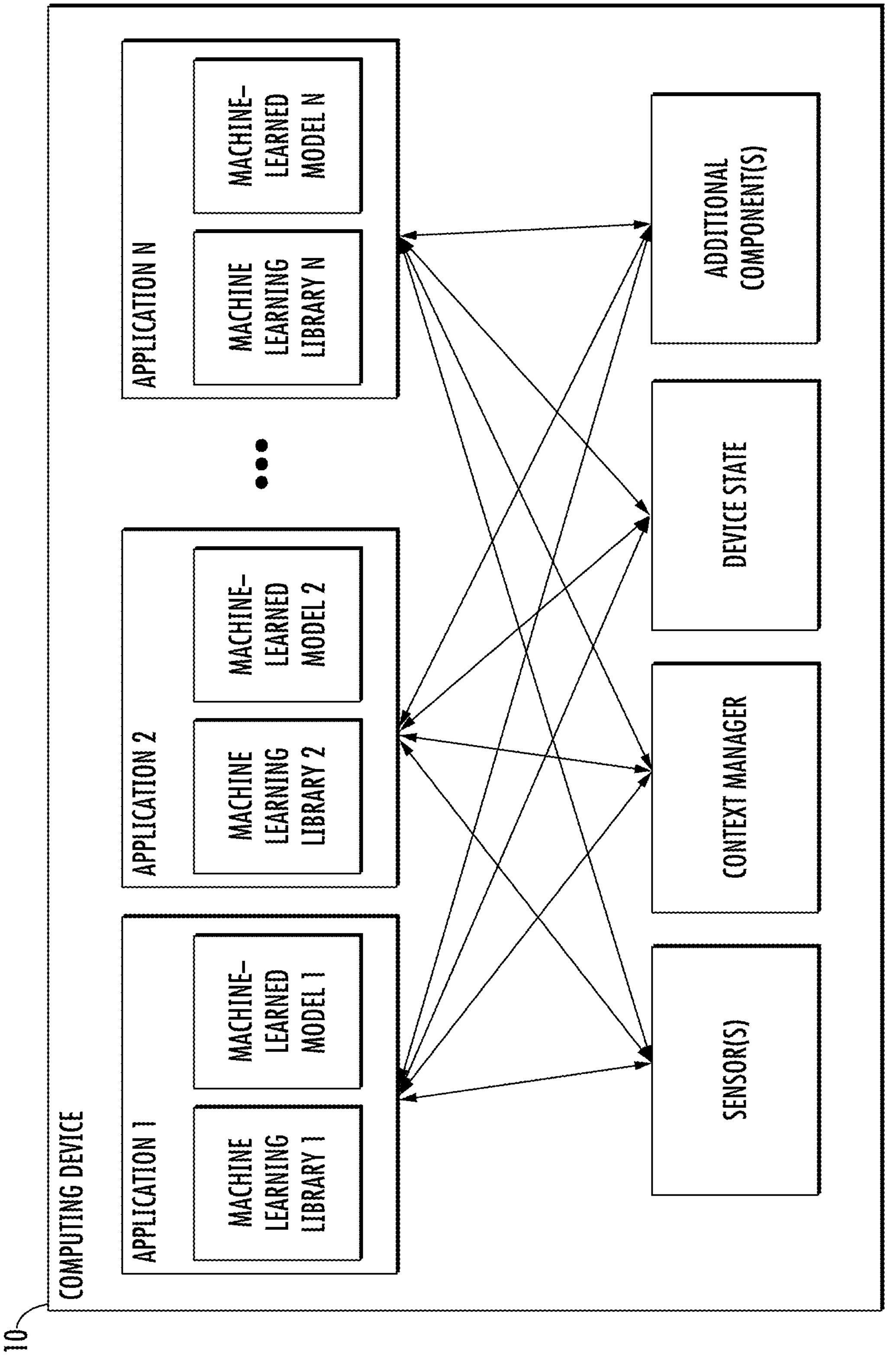
FIG. 1B depicts a block diagram of an example computing device that performs image augmentation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
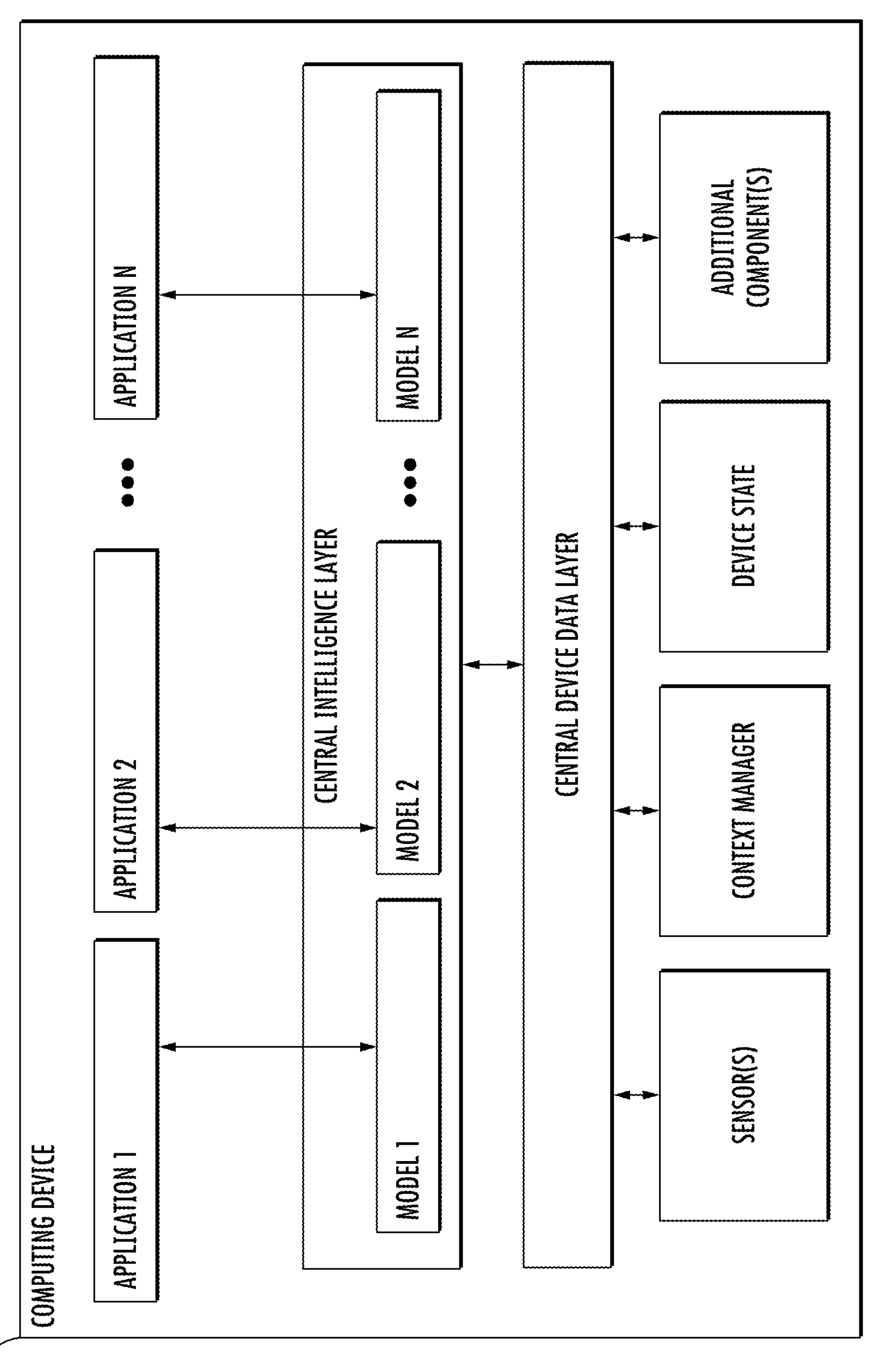
FIG. 1C depicts a block diagram of an example computing device that performs image augmentation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
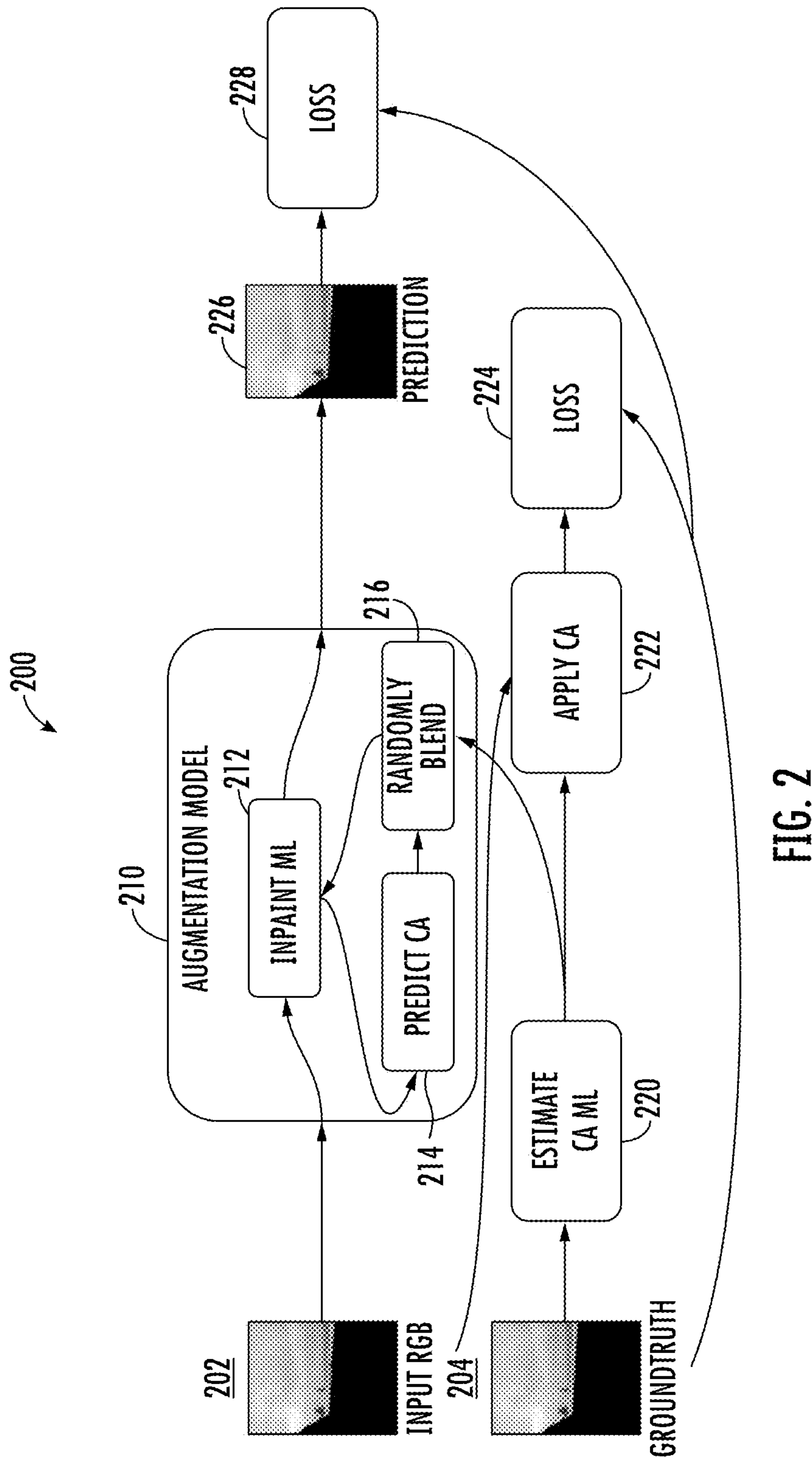
FIG. 2 depicts a block diagram of an example inpainting model training according to example embodiments of the present disclosure.

FIG. 2 depicts a block diagram of an example augmentation model 200 being trained according to example embodiments of the present disclosure. In some implementations, the augmentation model 200 is trained to receive a set of input data 202 descriptive of one or more images depicting a scene with one or more occlusions and, as a result of receipt of the input data 202, provide output data 226 that includes an augmented prediction image. Thus, in some implementations, the augmentation model 200 can include an image augmentation model 210 that is operable to replace occlusions in an image with predicted pixels.

Moreover, the example augmentation model 200 system depicted in FIG. 2 includes training flows for both the augmentation model 210 and the contextual attention model 220. The augmentation model 210 and the contextual attention model 220 can be trained simultaneously or separately. In some implementations, the contextual attention model 220 can be trained before the augmentation model 210.

Training the augmentation model 210 can involve obtaining input data 202 and ground truth data 204. The input data 202 and the ground truth data 204 can each respectively include one or more images. The ground truth images may depict a scene, and the input images may depict the scene with one or more occlusions added. The ground truth data 204 can be processed by a contextual attention model 220 to estimate contextual attention using machine-learning. The output of the contextual attention model 220 may include a contextual attention output. The input data 202 can be processed by the augmentation model 210 with the inpainting model 212. The input data 202 may be processed by a prediction model 214 to generate predicted contextual attention data. The predicted contextual attention data and the contextual attention output can then be processed with a blend model 216 to randomly blend the data to generate blended data. The blended data and the input 202 data can then be processed to generate predicted data 226. The predicted data 226 can include a predicted image that depicts the scene of the input image with the one or more occlusions replaced with predicted pixels. The predicted data 226 and the ground truth data 204 can then be used to evaluate a loss function 228. One or more parameters of the augmentation model 210 may be adjusted in response to the loss function 228 evaluation. The one or more parameters may be one or more parameters of at least one of the prediction model 214, the blend model 216, or the occlusion model 212. The trained augmentation model can then be used for inpainting tasks with or without user guidance.

The contextual attention model 220 can be trained by processing the ground truth data 204 to generate a contextual attention output. The contextual attention output and the input data 202 can then be processed with an inpainting model 222 to apply the contextual attention map to an inpainting task to generate training augmented data. The training augmented data and the ground truth data 204 can be compared to evaluate a training contextual attention loss function 224. Based on the evaluation, one or more parameters of the contextual attention model 220 may be adjusted. In some implementations, the input data 202, The ground truth data 204, and the training augmented data may each include a respective image, in which the training augmented image depicts the input image with one or more pixels replaced with predicted data based on the ground truth image 204.

Figure 3:
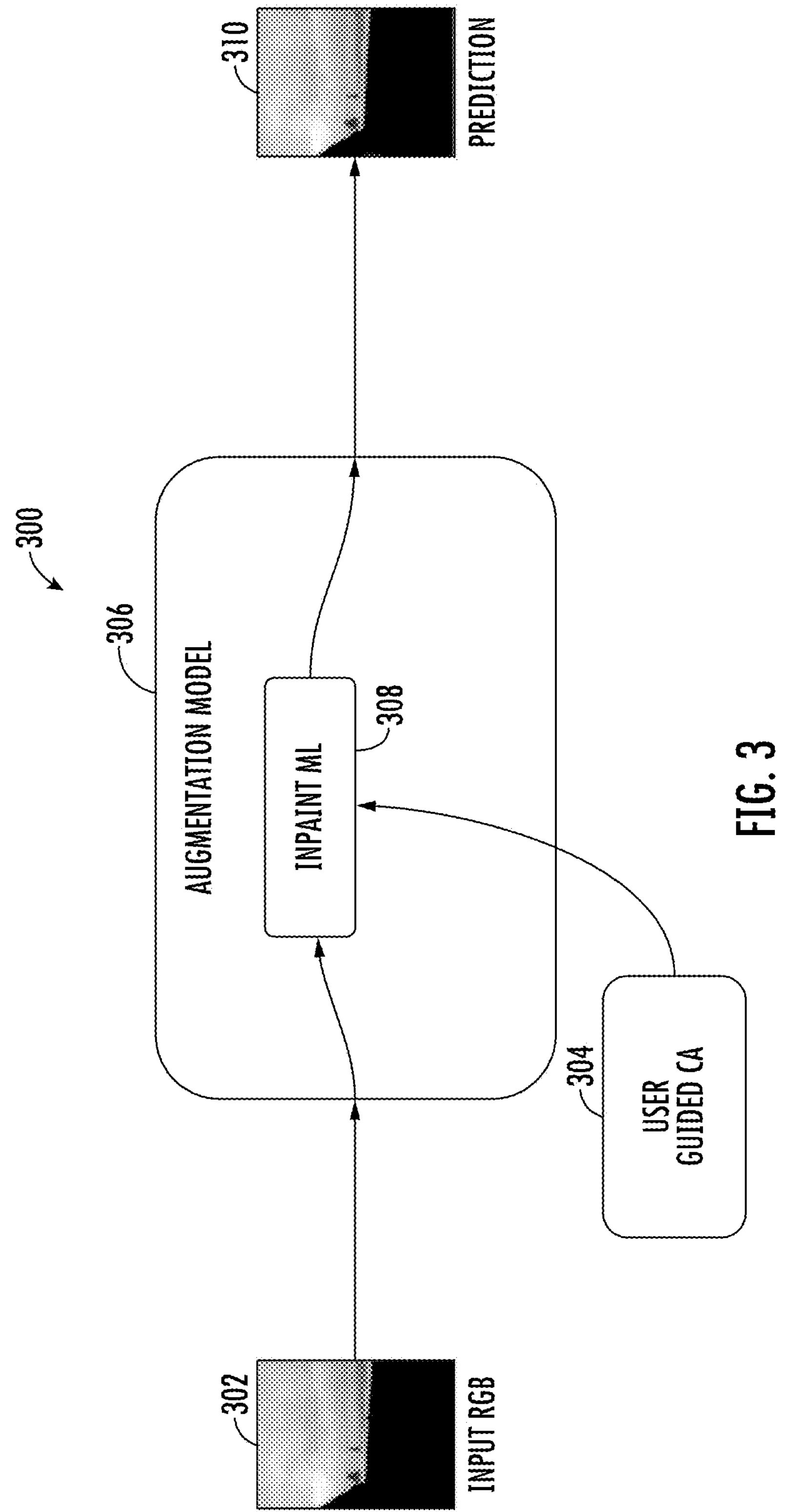
FIG. 3 depicts a block diagram of an example contextual attention inpainting model according to example embodiments of the present disclosure.

FIG. 3 depicts a block diagram of an example augmentation model 300 according to example embodiments of the present disclosure. In some implementations, the augmentation model 300 is trained to receive a set of input data 302 descriptive of an input RGB image with one or more objects the user wishes to replace and, as a result of receipt of the input data 302, provide output data 310 that includes an augmented RGB image with the one or more objects replaced with predicted pixels. Thus, in some implementations, the augmentation model 300 can include an inpainting augmentation model 302 that is operable to complete inpainting tasks.

In FIG. 3, the augmentation model 306 can perform inpainting tasks 308 based at least in part on user guided contextual attention data 304. For example, in this implementation, the augmentation model 306 can receive input data 302 and one or more user-inputs in the form of user guided contextual attention data 304 and generate augmented data 310. The augmentation model can be trained using ground truth training. In some implementations, the augmented data 310 can include prediction data generated based at least in part on the user guided contextual attention data 304. In some implementations, the input data 302 may include RGB image data that may be augmented by replacing a plurality of pixels to generate the augmented data 310. The pixels being replaced may be manually selected or may be automatically recognized. In some implementations, the data that replaces the plurality of pixels may include one or more pixels selected by a user.

Figure 4:
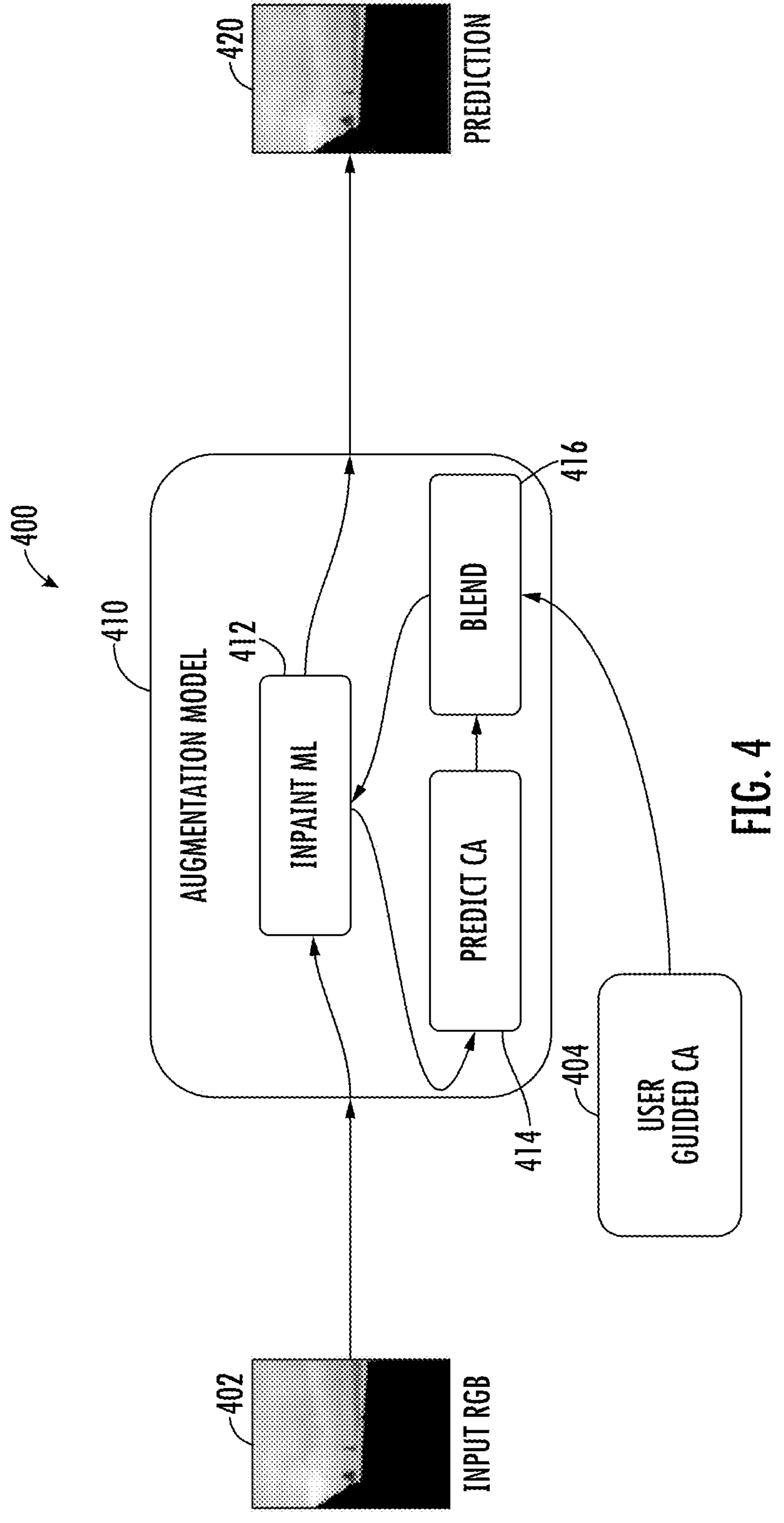
FIG. 4 depicts a block diagram of an example contextual attention inpainting model with blending according to example embodiments of the present disclosure.

FIG. 4 depicts a block diagram of an example augmentation model 400 according to example embodiments of the present disclosure. The augmentation model 400 is similar to augmentation model 300 of FIG. 3 except that the augmentation model 400 further includes a prediction contextual attention model 414 and a blend model 416.

In FIG. 4, the augmentation model 410 is configured to obtain input data 402 and user-input data 404. The augmentation model 410 can include one or more machine-learned models trained to perform inpainting tasks. For example, the augmentation model 410 in FIG. 4 includes a prediction model 414 for generating predicted contextual attention data 414, a blend model 416 for blending the predicted contextual attention data and the user-input data 404, and an occlusion model 412 for replacing occlusions in the input data 412 based on the blended data.

For example, the augmentation model 410 may obtain the input data 402 and the user-input data 404. The input data 402 may be processed with the prediction model 414 to generate predicted contextual attention data. The predicted contextual attention data and the user-input data 404 can then be blended with the blend model 416 to generate blended data. The blended data and the input data 402 may then be processed with the occlusion model 412 to replace one or more occlusions in the input data 402 in order to generate the augmented data 420.

Figure 5:
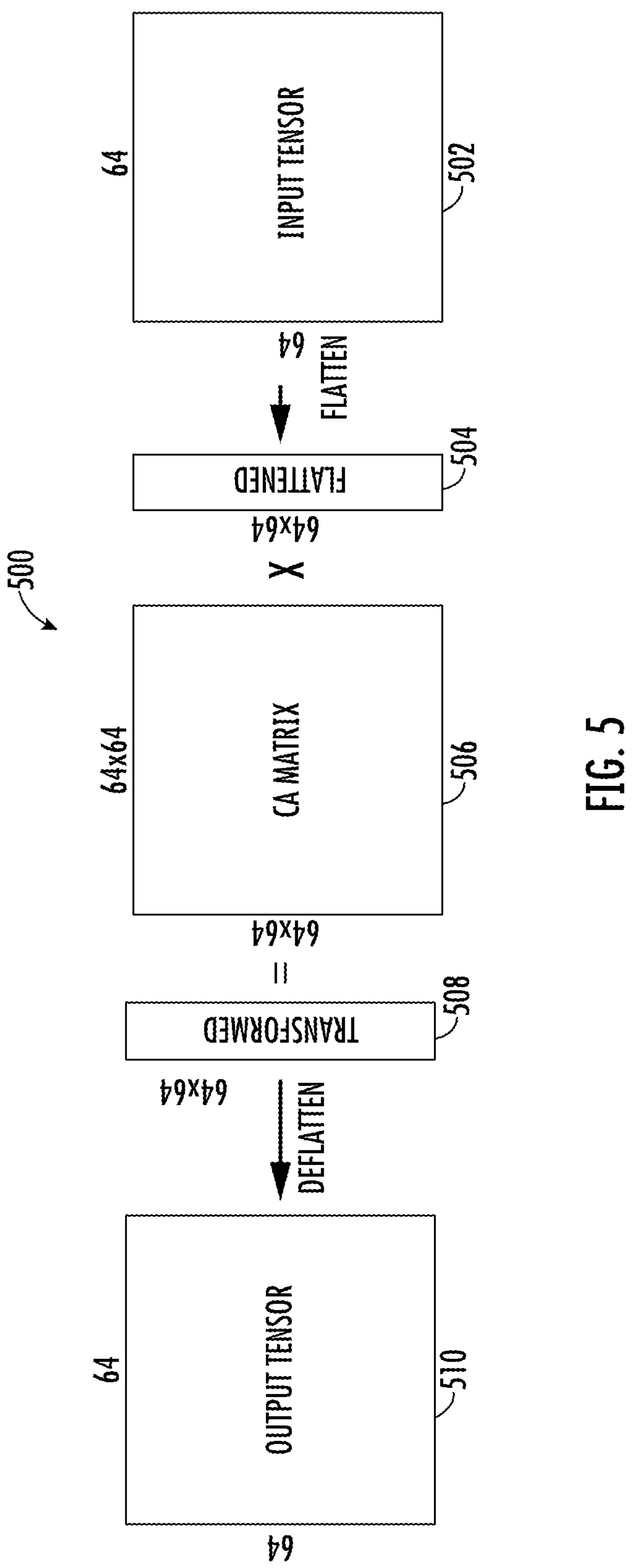
FIG. 5 depicts a block diagram of an example contextual attention mapping according to example embodiments of the present disclosure.

FIG. 5 depicts a block diagram of an example contextual attention model 500 according to example embodiments of the present disclosure. In some implementations, the contextual attention model 500 is trained to receive a set of input data 502 descriptive of an image and, as a result of receipt of the input data 502, provide output data 510 that is descriptive of a contextual attention output. Thus, in some implementations, the contextual attention model 500 can include a contextual attention matrix 506 that is operable to transform the flattened input tensor 502.

The contextual attention model 500 can be used for contextual attention mapping. Contextual attention mapping can include receiving an input tensor 502. The input tensor 502 can then be flattened 504. The flattened input tensor 504 can be processed with a contextual attention matrix 506 to generate transformed data 508. The transformed data can then be deflattened to generate an output tensor 510.

FIG. 9 depicts an illustration of an example inpainting process 900 according to example embodiments of the present disclosure. The first image 902 can be the input image. The input image may be an RGB image. The input image can include one or more occlusions.

The second image 904 includes the recognition of a human 910 and a plane 912 occluding the scene. A set of source pixels 908 can be identified for use in replacing the pixels depicting the plane 912.

Lastly, the third image 906 includes an indication of the source pixels 914 selected for replacing the pixels depicting the human 910. The replacement may then be completed by blending predicted contextual attention data with the selected/identified source pixels 912 and 914 then generating an augmented image based on the blended data and the input image.

Figure 10:
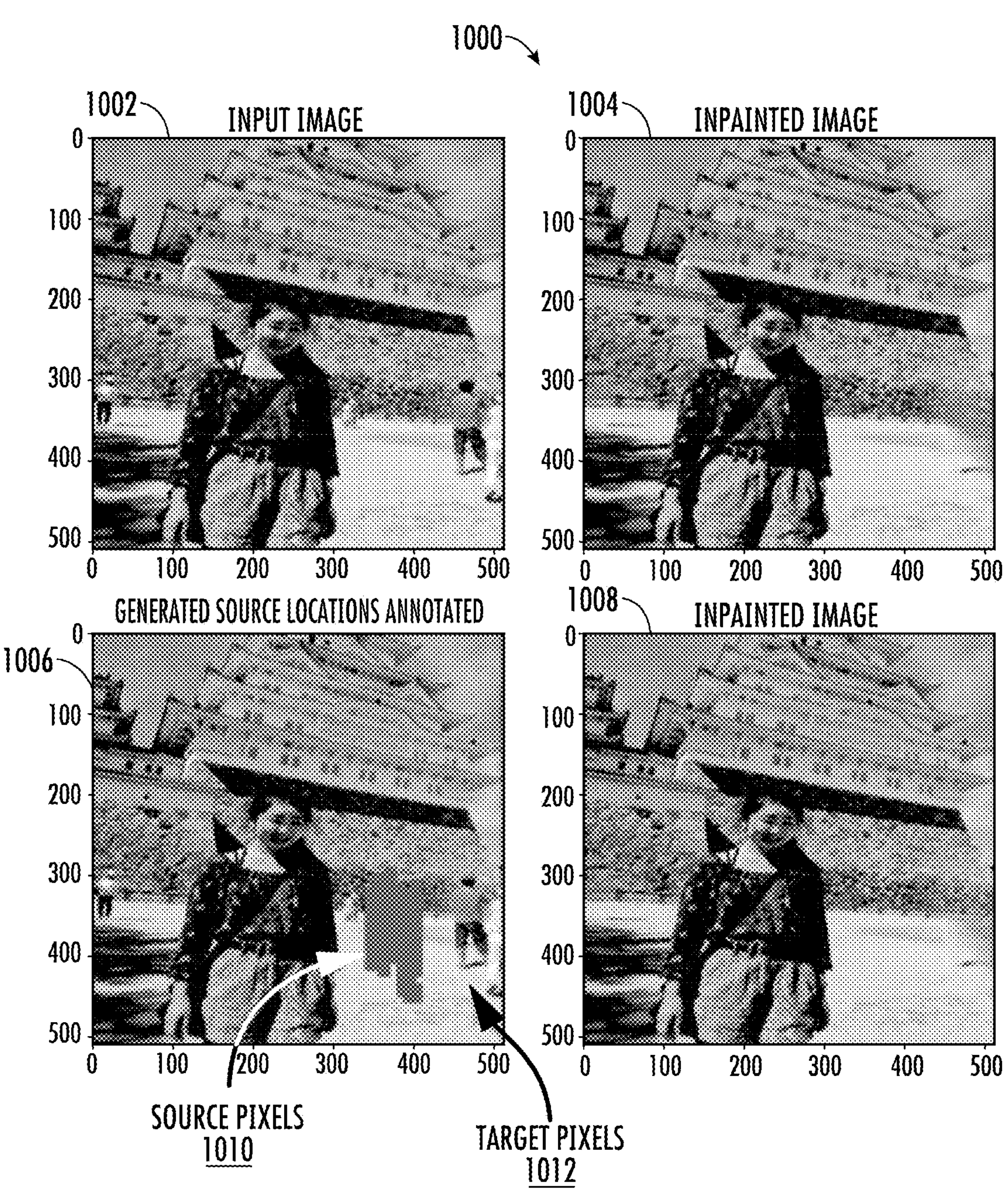
FIG. 10 depicts an illustration of an example contextual attention inpainted image according to example embodiments of the present disclosure.

FIG. 10 depicts an illustration of example inpainting results 1000 according to example embodiments of the present disclosure.

The top left image 1002 depicts an example input image. The input image can be processed with an inpainting model without user guided inputs to generate the inpainted image in the top right image 1004. The inpainted image includes replacement pixels in place of the one or more occlusions (e.g., people).

The bottom left image 1006 depicts the input image with a representation of the user input 1010 overlayed over the input image. The user input 1010 can include a contextual attention input selection of a portion of the input image to use as source pixels. The target pixels 1012 for replacement may be automatically recognized or may be manually selected. In some implementations, a prediction model may process the input image to generate predicted contextual attention data. The predicted contextual attention data and the contextual attention input can be processed with a blend model to generate blended data. The blended data and the input image can then be processed to generate the augmented image depicted in the bottom right 1008. The augmented image based in part on the user-inputs 1010 may provide a more accurate prediction than the inpainted image generated without user-inputs.

Figure 11:
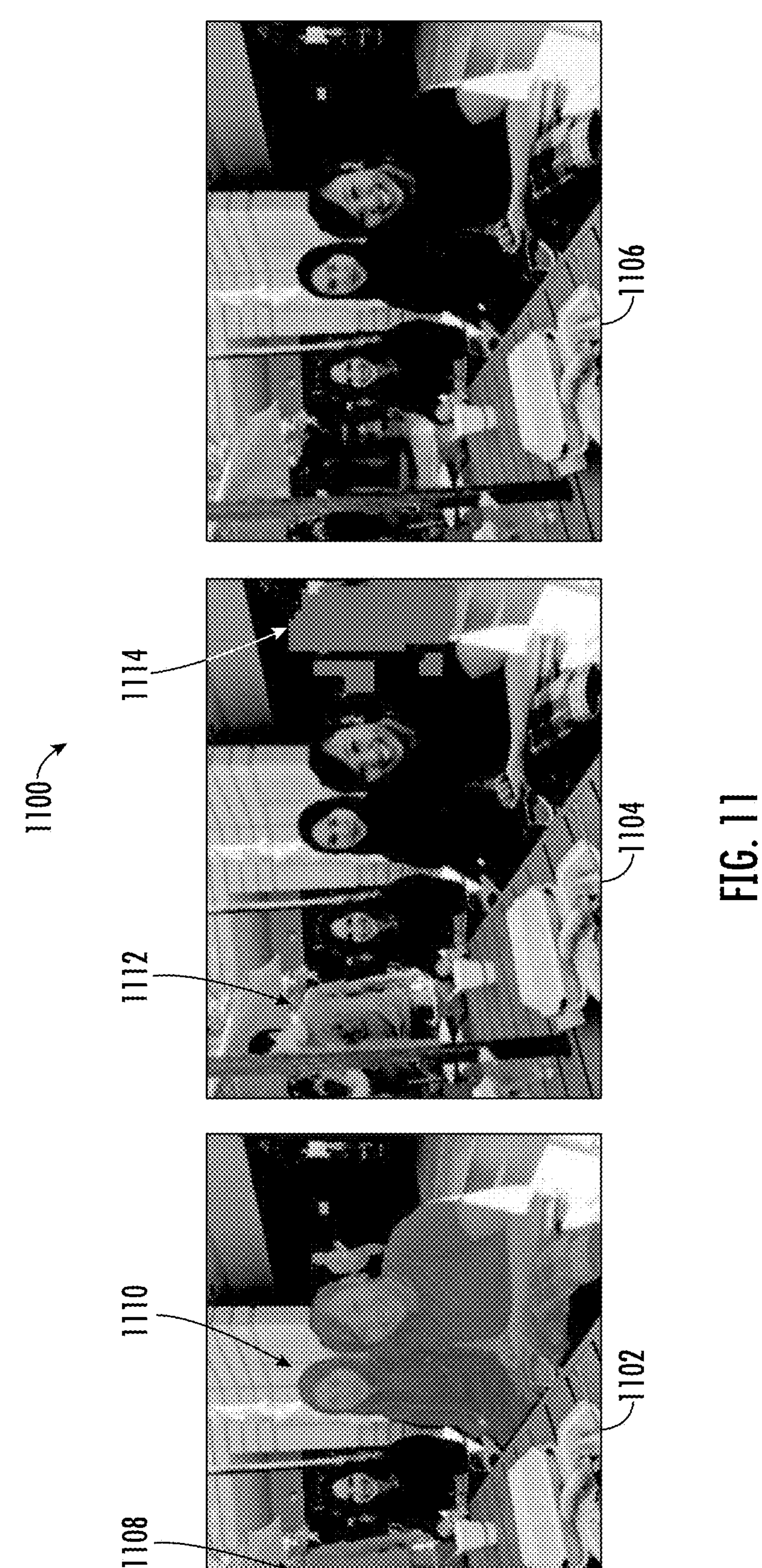
FIG. 11 depicts an illustration of an example contextual attention inpainted image according to example embodiments of the present disclosure.

FIG. 11 depicts an illustration of example inpainting results 1100 according to example embodiments of the present disclosure. The first image 1102 can be an input image and may include one or more occlusions to replace. For example, the input image can include one or more humans the user wishes to remove from the scene. The one or more machine-learned models may recognize one or more objects in the image to keep and one or more objects to remove. The one or more objects to keep 1110 may be indicated via a representation overlayed over a portion of the input image in a first color. The one or more objects to remove 1108 may be indicated via a representation overlayed over a portion of the input image in a second color. The user may select an object to remove 1112 and may select a portion of the image to use as source pixels 1114. The selections can be indicated via one or more representations overlayed over the image. The second image 1104 depicts a representation indicating a portion of the image to use as source pixels 1114. The selected source pixels 1114 and the input image may be processed with an augmentation model to generate the output image 1106 with the unwanted object replaced with replacement pixels.

Figure 12:
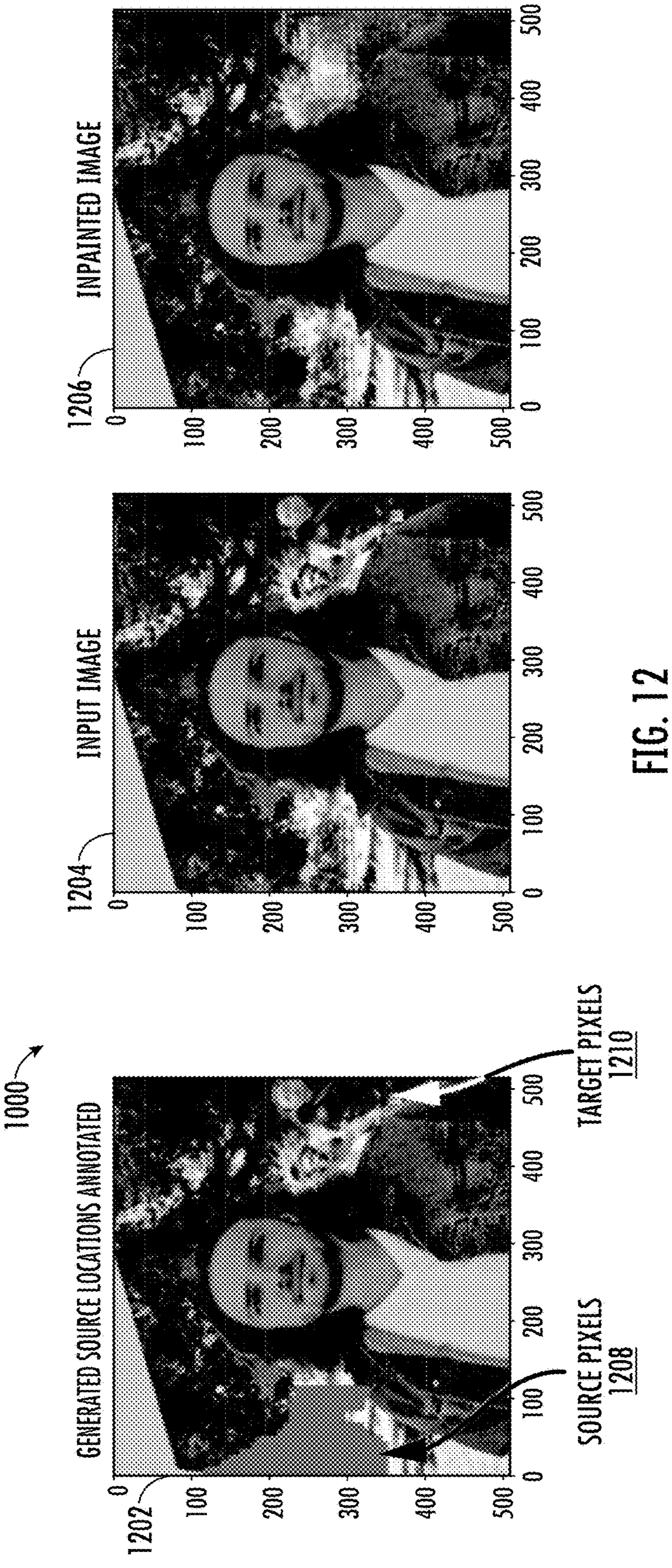
FIG. 12 depicts an illustration of example blended inpainting results according to example embodiments of the present disclosure.

FIG. 12 depicts an illustration of example inpainting results 1200 according to example embodiments of the present disclosure. In some implementations, the input image 1204 can be provided for display as part of a visual interface. The input image 1204 can include one or more occlusions the user wishes to remove. The occlusions can be manually selected or may be automatically recognized using one or more recognition techniques. The visual interface may provide an overlay interface 1202 that can indicate the recognized occlusions 1210 using one or more representations overlayed over the input image. The user may interact with the visual interface to provide user-inputs that select a portion of the image to use as source pixels 1208. The selected source pixels 1208 can be indicated with one or more indicia.

The augmentation system for image inpainting can process the input image 1204 with a prediction model to generate predicted contextual attention data. The predicted contextual attention data and the contextual attention data generated based on the user-inputs can be processed with a blend model to generate blended data. The blended data and the input image 1204 can then be processed with an occlusion model to generate an augmented image 1206 that includes replacement pixels instead of the pixels used to depict the one or more occlusions. The blending weight for the blend model may be manually selected or may be automatically determined during training of the one or more models.

The systems and methods disclosed herein can include one or more occlusion models or one or more inpainting models for augmenting data. The inpainting models and/or the occlusion models disclosed herein can include conditional variational autoencoders for processing input data and the blended data in order to generate augmented data.

According to aspects of the present disclosure, the replacement data can be predicted by a machine-learned model such as, for example, a conditional variational autoencoder. The predicted replacement data can be based largely on the data that is not obstructed.

In particular, the proposed inpainting systems may utilize machine-learning technology to better refine the predicted replacement data that may be inpainted into the image. Training of the occlusion model(s) and/or the inpainting model(s) can involve a ground truth image, an augmented image, and a mask. The ground truth image can be an image without unwanted data. The input image can be the ground truth image with a portion of the image being occluded by unwanted data (e.g., the unwanted data can be added to the ground truth image data to generate the augmented image data). The mask (e.g., a binary pixel mask) can indicate the location and/or size of the unwanted data within the augmented image data. The mask can be automatically generated or may be generated based at least in part on one or more user-inputs.

As one example, the proposed inpainting systems can utilize a machine-learned autoencoder model to perform the prediction of the replacement image data. The autoencoder model can be, for example, a conditional variational autoencoder. In some implementations, the autoencoder model can include an encoder model configured to encode input image data to generate encoded data and a decoder model configured to predict the replacement data based on the encoded data generated by the encoder.

In some implementations, training of the occlusion model (s) can begin by generating the input image data from the ground truth image data (e.g., by adding unwanted data to the ground truth image data). A mask (e.g., a binary pixel mask) can indicate the location(s) of the unwanted data within the augmented image data.

Next, the input image can be input into the encoder with the mask to generate encoded data, which also may be referred to as an embedding, as an output of the encoder. In some implementations, during training, the ground truth image and mask is also encoded by using a second, different encoder. The encoded ground truth image can be used to create distribution values, or a feature vector, to be used to aid in the prediction process of decoding to narrow the prediction possibilities. In some implementations, the distribution values can be multiplied by a random value to require the decoder to rely on both the embedding and the feature vector in decoding and predicting (e.g., to generalize the decoder model).

The encoded data produced from the input image data with mask and combined with the feature vector can be input into the decoder. The decoder can decode the data to create a replacement image. Stated differently, the decoder can predict replacement data, which replaces the unwanted data in an attempt to match the ground truth data.

Specifically, after the image is decoded, the replacement image can be evaluated against the ground truth image using any number and/or combination of different loss functions. Three example loss functions that can be used include: a L1 loss function, a VGG loss function, and an adversarial loss function. After the evaluation, a modification or update step can be performed to update the parameters (e.g., of the encoder and/or decoder models) based on the loss function (s). The training can be iteratively repeated over a number of ground truth and input image training examples.

Once training is completed, the system can be run to generate replacement data for portions of an input image identified as unwanted by a mask. In particular, at inference time, a new input image with some unwanted data can be provided to the trained encoder model along with a mask that identifies the location and/or size of the unwanted data within the input image. The encoder can produce encoded data (e.g., which may also be referred to as "an embedding") based on the input image and mask.

Further, in some implementations, a conditioning vector (e.g., which may in some instances be a zero vector) can be included with (e.g., concatenated to) the embedded data generated by the encoder from the input data and the mask. As the system can be trained with randomized feature vectors, a well-trained system can produce reasonable results. The system may use the trained parameters to create replacement data in place of the unwanted data.

Thus, at inference time, image data with unwanted image data can be inputted into the encoder along with a mask that identifies the unwanted image data. The encoded image data can then be inputted into the decoder with a conditioning vector. The decoder can output a replacement image in which the unwanted image data has been removed and replaced with replacement data (e.g., which depicts a portion of the scene that was previously occluded by the unwanted image data).

A method for inpainting with machine-learning which accurately replaces the unwanted data with predicted replacement data allows for the removal of unwanted objects and people from pictures or videos. The same need can be found in other forms of media including audio waveform data (e.g., it may be desired to remove unwanted noise such as clicks, hiss, or the like, or it may be desired to isolate a single speaker by removing audio data that corresponds to other speakers or background noise). The unwanted data can be replaced with predicted data based on properties in the remaining data. Thus, although the systems and methods are described herein with reference to visual image data such as scenes, they can also be applied to other types or modalities of data (e.g., audio data, audio data/sound images, text data, text images etc.) in which replacement data is predicted to replace unwanted data. Further, image data can include two-dimensional image data (e.g., photographs) or three-dimensional image data (e.g., mesh models or point clouds such as, e.g., LiDAR point clouds). For example, for a point cloud, a mask may indicate which points in the point cloud are unwanted. More generally, for various other modalities, the mask may indicate which portion(s) of the data are unwanted.

As inpainting and data replacement can be non-deterministic, the prediction needed for the creation of replacement data can be difficult. Machine-learning can be one method for training a system to more accurately predict the correct replacement data. The trained prediction system can then be utilized to create the most accurate replacement data. Training using ground truth data and input data can allow for the system to evaluate and modify the parameters of the system to more accurately predict what is being occluded by the unwanted data. Use of ground truth data for training means that the training process is not non-deterministic.

The process of removing unwanted image data from image data may be referred to as inpainting. Machine-learned models can be implemented into a system or process in order to provide increasingly more precise and efficient outcomes for automated inpainting. For example, in some implementations, inpainting can be accomplished through the utilization of a conditional variational autoencoder.

In some implementations, the system or method may utilize a conditional variational autoencoder for dense prediction in tandem with a discrimination component, in which the discrimination component separates the entire image data into two areas, existing and missing. The conditional variational autoencoder may use ground truth information in addition to the embedded feature vector of a variational autoencoder. The conditional variational autoencoder may use the image pixels outside of the unwanted image data to aid in prediction.

In some implementations, ground truth image data may be utilized for training the occlusion models and/or the inpainting models. In some implementations, training includes: intaking of the input image data with an encoder with a mask that indicates the size and location of the unwanted image data, outputting embedded data, intaking the ground truth image with the mask by another encoder, outputting a feature vector, randomizing the feature vector, inputting the embedded data and the randomized feature vector into a decoder, outputting replacement image data, evaluating the replacement image data against the ground truth image, and modifying the parameters of the operation based on the evaluation of the replacement image data versus the ground truth image data.

In some implementations, ground truth data may be data that does not include unwanted data. Ground truth data can be an ideal outcome of replacement data created by the system. Ground truth data can be a useful data set for determining the accuracy of the inpainting method or system.

In some implementations, augmented data may include unwanted data. In some implementations, the unwanted data can be data that obscures the ground truth data. For example, unwanted data left after an image has been subjected to a denoising process, or a human being obscuring a landscape in a picture.

In some implementations, augmented data may be a created data set. The augmented data may be produced by addition of unwanted data into a set of ground truth data. For example, several pixels of a set of ground truth image data may be occluded by the addition of a color blotch or other object. The color blotch may be considered unwanted data, and therefore, the inpainting system may be used to remove and replace the color blotch or other object.

In some implementations, a mask may be included in the inpainting system or method. A mask may be an indicator of the size and location of the unwanted data. The mask may be used to separate what needs to be replaced and what data is part of the desired data set. In some implementations, an inverse mask may be created for discriminative training.

In some implementations, the mask can be manually created by a user. In some implementations, the mask can be automatically created. In some implementations, the automated creation of the mask may be done by a system trained to create masks with a machine-learned model (e.g., a segmentation model).

In some implementations, a machine-learned model may be utilized to train and provide rules for the inpainting system. One example of a machine-learned model that can be trained and implemented may be a conditional variational autoencoder. For example, the system may have an upper variational encoder pipeline and a lower encoder pipeline. For example, the upper pipeline may include an encoder for encoding augmented data and a mask to create embedded data, and the lower pipeline may include an encoder for encoding the ground truth data to create a feature vector. In some implementations, the upper and lower pipelines may converge. The embedded data with the guidance of the feature vector may produce replacement data, when inputted into a decoder.

In some implementations, the feature vector may include distribution values. The distribution values may be a standard deviation value and a mean value. In some implementations, the distribution values can be randomized to ensure the decoder does not rely solely on the feature vector for predicting replacement data.

In some implementations, the conditioning vector may be a zero vector. In some implementations, the zero vector may provide reasonable prediction data because of the training with assorted feature vectors.

In some implementations, the evaluation of the replacement data against the ground truth data may be quantified by a loss function. Loss functions may be used individually or in any combination. For example, an L1 loss function, a VGG loss function, and/or an adversarial loss function may be used in combination to evaluate the model's prediction. The evaluation may also be completed with any of the three loss functions individually. In some implementations, a KL divergence loss function can aid in evaluating the training. For example, a KL divergence loss function may have a second term trend to zero. The trending towards zero may indicate an improvement in the system, and that the system is becoming closer to being optimized.

In some implementations, the discriminator method or system involves two-levels: a semantic level and a texture level. The semantic level can be related to the understanding of the data as a whole. The texture level may be related to the finer portions of the predicted data including the sharpness of the replacement data.

In some implementations, the inpainting system and method may be applied to three-dimensional point cloud editing. One or more points in a point cloud may be unwanted data and may need to be removed or replaced. In some implementations, the inpainting system or method for three-dimensional point clouds may be trained with ground truth three-dimensional point clouds, input three-dimensional point clouds, and masks. The input three-dimensional point clouds may be a ground truth three-dimensional point cloud with an addition of unwanted data. The unwanted data may be out-of-place points, unwanted points, or some other form of occluding data. The mask may be an indicator of the location of the unwanted data.

In some implementations, the inpainting system and method may be applied in speech recognition, to infill areas of a received speech segment that have a low audio quality. The infilled speech segment may then be provided as input to a speech recognition system. Improving the audio quality of the speech segment provided to the speech recognition system may lead to greater accuracy of the speech recognition process, and/or allow speech recognition to be used with low audio quality speech segments.

In some implementations, the inpainting system and method may be applied to colorize black and white photographs. For example, in some implementations, a set of black and white photographs may be colorized manually or with computer aid. For example, to train the colorization system, the set of manually colorized black and white photographs may be inputted into the inpainting system as ground truth data, and the original black and white photographs may be inputted in place of the augmented data. The colorization system may use this data sample to train. Once training is completed, the system may produce colorized images from old black and white photographs that have not been previously colorized.

In some implementations, the inpainting system may replace or may be used in tandem with a denoising variational autoencoder. For example, a denoising variational autoencoder may remove noise from the set of data, and the inpainting system may remove and replace the unwanted data left after the denoising process.

In some implementations, the inpainting system may be a web application. In some implementations, the system may be an offline desktop application. Moreover, the system can be a mobile application. In some implementations, the system may be an add-on or extension for another application. The system can be a built-in feature of a larger application. In another example, the system can be provided as a service (e.g., as a service layer and/or by a server computing device). In some implementations, the automated mask creation can be built-in to the same application as the inpainting system.

In some implementations, the conditional variational autoencoder may include two autoencoders. The lower encoder may only be utilized in training by generating a feature vector by encoding the ground truth image data. The feature vector may be penalized by the KL Divergence loss function to require the conditional variational autoencoder to not solely rely on the feature vector. The randomization of the feature vector may still provide useful information for the decoder prediction.

The upper encoder may encode input image data and a mask. The input image data may be ground truth image data occluded by an object or other unwanted image data. The encoded input image data and mask may be added to the feature vector from the lower encoder. The added data may then be decoded to generate replacement image data. The operations may be implemented as concatenation.

In some implementations, the inference process may include the conditional variational autoencoder with the upper encoder but does not include the lower encoder. The lower encoder may be replaced with a conditioning vector such as, for example, a zero vector. The zero vector may produce reasonable image data due to the randomized feature vector training.

In some implementations, the system or method may include large information from the upper encoder being the primary source for prediction data. In some implementations, the upper encoder and the decoder may have skip connections within the convolutional neural network.

In some implementations which use an adversarial loss during training, the discriminator model used to generate the adversarial loss may be separated into two levels, texture and semantic. The discriminator may have the two layers separated. The discriminator may aid in distinguishing real image data from replacement image data generated by the decoder. In some implementations, the input image resolution may be changed. For example, the input image resolution may be changed from 256 pixels by 256 pixels to 16 pixels by 16 pixels. The 16×16 image may be the receptive field to address the texture of the replacement area. The image may be isolated with the aid of a segmented image mask. The semantic component of the model may look at the image data as a whole. Therefore, the predicted replacement data may be aided by both texture and semantic components of the discriminator.

In some implementations, the discriminator model may include two texture-level networks and a semantic level network. The first texture-level network may process a portion of ground truth image data at the locations indicated by the mask and may output a first texture discriminator output. The second texture-level network may process a portion of predicted image data at the locations indicated by the mask and may output a second texture discriminator output. The semantic level network may include a shared network. In some implementations, the shared network may process the ground truth image data with the unwanted data removed therefrom to generate a semantic discriminator output. In some implementations, the semantic level network may utilize an inverse mask for the discriminator processing. The semantic level network may generate a discriminator output based on the first texture discriminator output, the second texture discriminator output, and the semantic discriminator output.

In some implementations, the inpainting problem may be addressed by using a variable encoder pipeline, a double encoding discriminative training, and/or human perceptual loss. The system or method may implement these features individually or in any combination. The variable encoding pipeline may include ground truth image data being used as input to train the inpainting model. The model may include a noise changing model to address potential issues with the magnitude of noise in the predicted replacement data. The double encoding discriminative training may first address the texture level of the isolated unwanted image data, then may address the semantic level data to discriminate the ground truth data and the predicted data in training. In some implementations, the inpainting model may further include a texture synthesis step to address any extremes generated by the prediction step.

Example Methods

Figure 6:
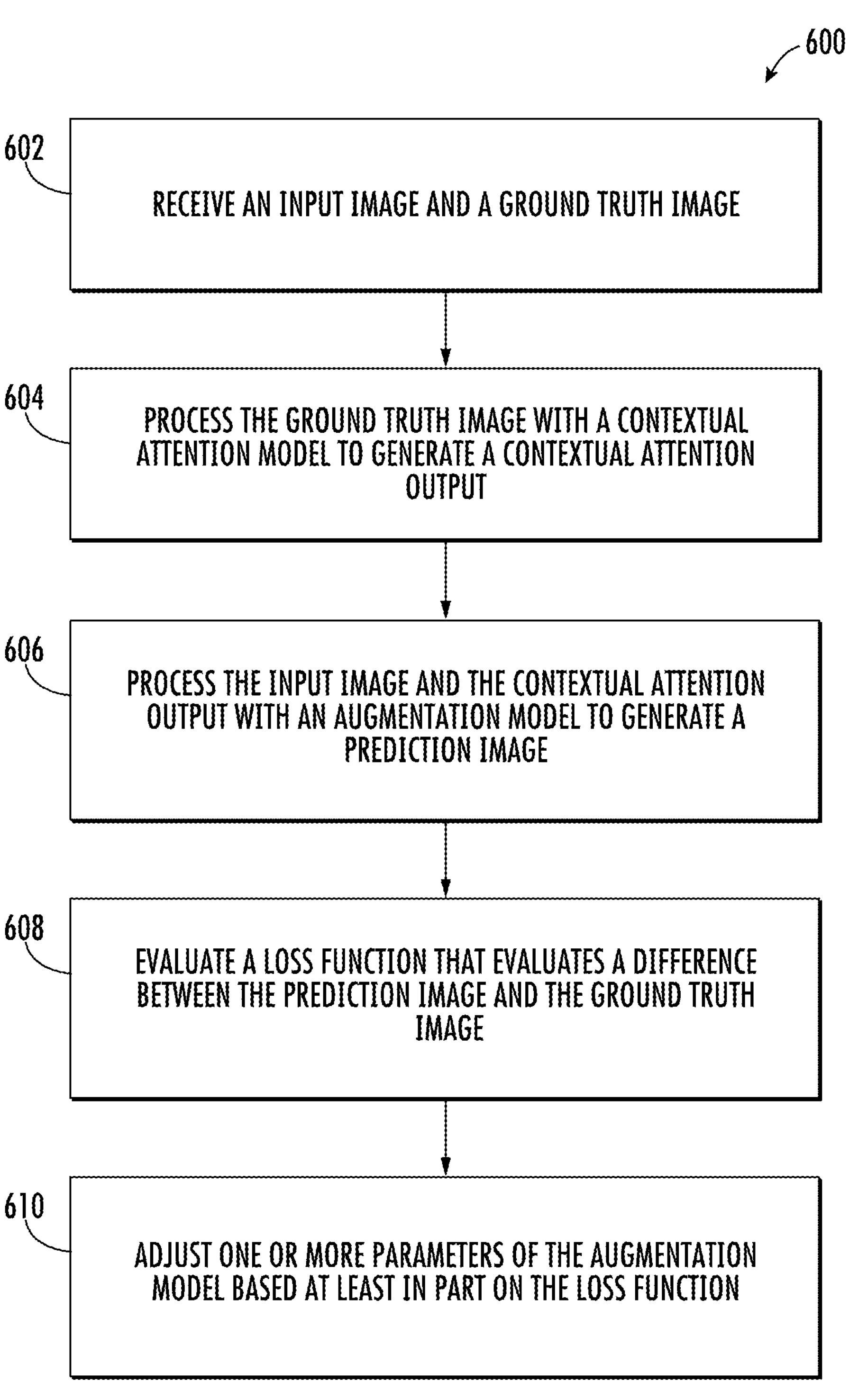
FIG. 6 depicts a flow chart diagram of an example method to perform augmentation model training according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can receive an input image and a ground truth image. The input image can be generated by adding one or more occlusions to the ground truth image. In some implementations, the ground truth image can depict a scene, and the input image can depict the scene with one or more occlusions. The one or more occlusions can include humans, animals, or objects occluding a portion of the scene.

At 604, the computing system can process the ground truth image with a contextual attention model to generate a contextual attention output. The contextual attention model can include a convolutional neural network and one or more contextual attention blocks. Training the contextual attention model can include processing one or more training images with the contextual attention model to generate training contextual attention outputs. The training contextual attention outputs and the input image can then be processed with an inpainting model to generate a training augmented image. A training loss function can then be evaluated based on a difference between the training augmented image and the ground truth image. One or more contextual attention parameters can then be adjusted based at least in part on the training loss function.

At 606, the computing system can process the input image and the contextual attention output with an augmentation model to generate a prediction image. The prediction image can include the contents of the input image with the one or more occlusions replaced with predicted pixels. The augmentation model may include a plurality of sub-blocks including a prediction model and a blend model. The prediction model may process the input image to generate predicted contextual attention data. The blend model may process the predicted contextual attention data and the contextual attention output to generate blended data. The blend model may be trained to randomly blend the predicted contextual attention data and the contextual attention output. In some implementations, the augmentation model may include an occlusion model to process the blended data and the input image to generate the prediction image.

At 608, the computing system can evaluate a loss function that evaluates a difference between the prediction image and the ground truth image. The loss function can include a perceptual loss, a GAN loss, a VGG loss, and/or a KL divergence loss.

At 610, the computing system can adjust one or more parameters of the augmentation model based at least in part on the loss function. In some implementations, one or more parameters of at least one of the prediction model, the blend model, or occlusion model.

Figure 7:
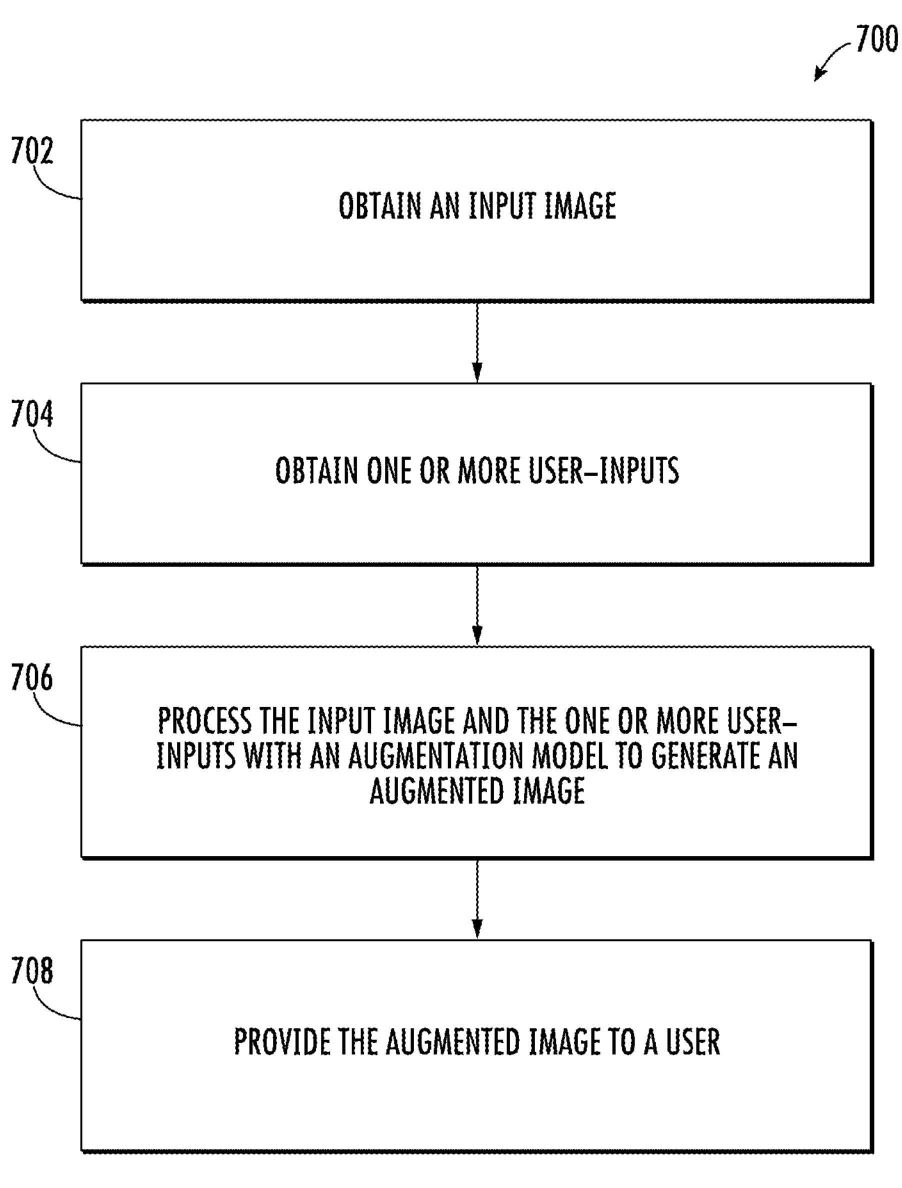
FIG. 7 depicts a flow chart diagram of an example method to perform augmentation of an image based on contextual attention according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain an input image. The input image can include one or more objects for replacement. The objects can be depicted with a plurality of pixels in the input image and may be recognized by object recognition techniques.

At 704, the computing system can obtain one or more user-inputs. The one or more user-inputs can include one or more contextual attention inputs. The one or more user-inputs can include one or more selections of portions of the input image. The one or more user-inputs can include a lasso gesture input, brush gestures, and/or tap gestures. In some implementations, the user-inputs can include a first set of user-inputs to select a portion of the input image to replace and a second set of user-inputs selecting portions of the image to clone for image augmentation.

At 706, the computing system can process the input image and the one or more user-inputs with an augmentation model to generate an augmented image. The augmentation model can be trained with ground truth training. The augmented image can include the scene of the input image with the one or more objects replaced with predicted pixels. The augmentation model can include a blend model trained to blend predicted contextual attention data and user-inputted contextual attention data, in which the predicted contextual attention data can be generated based at least in part on the input image, and the user-inputted contextual attention data can be based at least in part on the one or more user-inputs. The blending weight for the blend model may be manually selected by a user or may be automatically determined.

At 708, the computing system can provide the augmented image to a user. The augmented image may be sent to a user computing device and/or may be provided for display on a user computing device's visual display. The augmented image may be provided for display as part of a visual interface. In some implementations, the visual interface may provide the input image for display and may receive the user-inputs via the user interface (e.g., selections to a touch screen display while providing the visual display). In some implementations, a representation of the one or more user-inputs may be provided as part of the visual interface, in which the representations can be overlayed over the input image.

Figure 8:
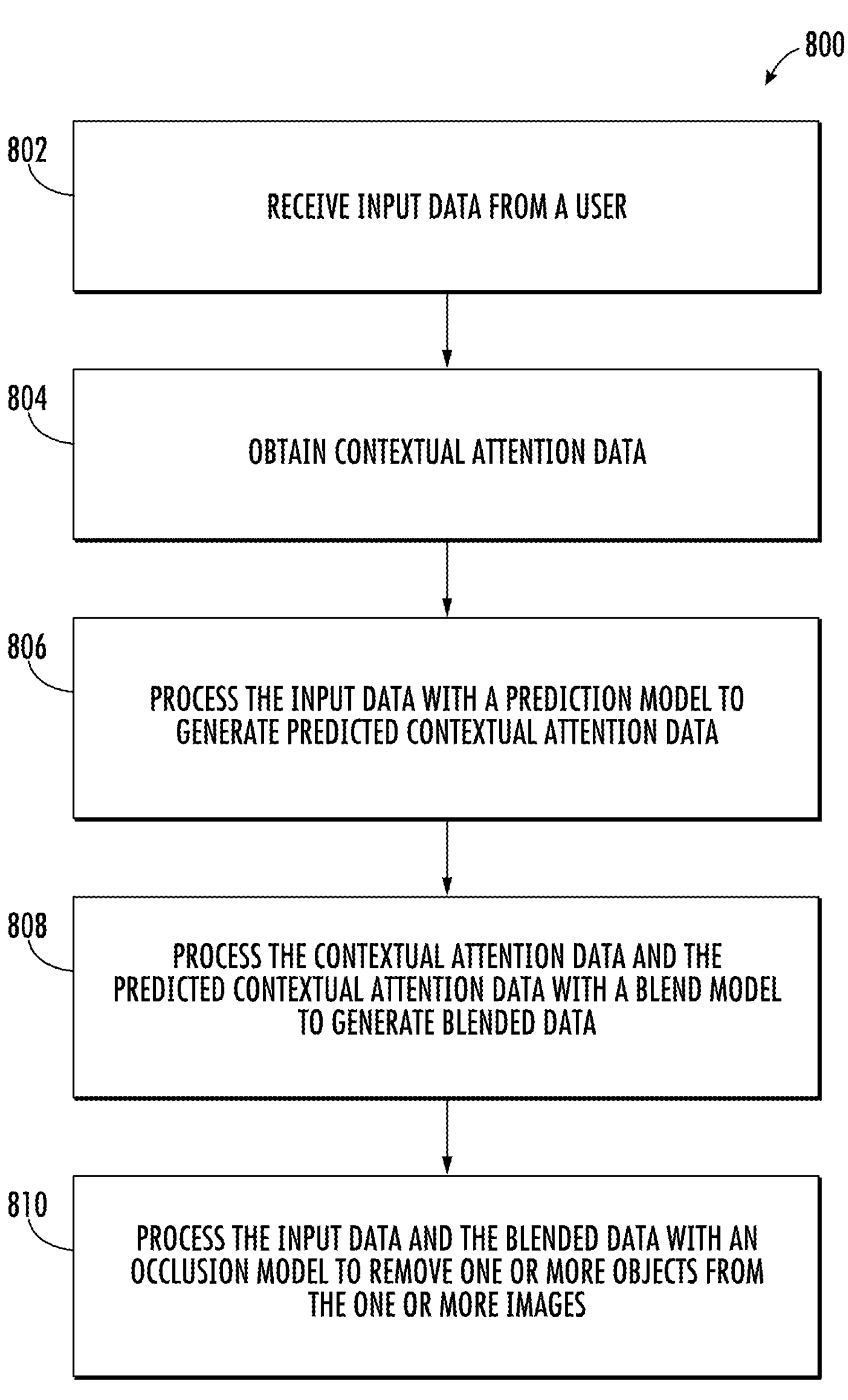
FIG. 8 depicts a flow chart diagram of an example method to perform augmentation of an image according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can receive input data from a user. The input data can include one or more images. In some implementations, the input data can include audio data. In some implementations, the one or more images can be frames of a video.

At 804, the computing system can obtain contextual attention data. The contextual attention data can include selected pixel data. The contextual attention data may include a flattened input tensor. In some implementations, the contextual attention data can be generated based at least in part on a lasso gesture input by a user.

At 806, the computing system can process the input data with a prediction model to generate predicted contextual attention data.

At 808, the computing system can process the contextual attention data and the predicted contextual attention data with a blend model to generate blended data.

At 810, the computing system can process the input data and the blended data with an occlusion model to remove one or more objects from the one or more images. In some implementations, the output of the occlusion model can include an augmented video output. In some implementations, the input data and the blended data can be processed to remove occlusions from audio data. In some implementations, the occlusion model can be trained using an occlusion model.

The computing system may add the one or more pixels back into the one or more images to generate a rendered image.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training an inpainting model, the method comprising:

receiving, by a computing system comprising one or more processors, an input image and a ground truth image, wherein the ground truth image depicts a scene, and wherein the input image depicts the scene with one or more occlusions;

processing, by the computing system, the ground truth image with a contextual attention model to generate a contextual attention output;

processing, by the computing system, the input image and the contextual attention output with an augmentation model to generate a prediction image, wherein processing the input image and the contextual attention output with the augmentation model comprises:

processing the input image to generate predicted contextual attention data;

generating blended data based on the predicted contextual attention data and the contextual attention output;

generating the prediction image based on the blended data and the input image;

evaluating, by the computing system, a loss function that evaluates a difference between the prediction image and the ground truth image; and adjusting, by the computing system, one or more parameters of the augmentation model based at least in part on the loss function.

2. The computer-implemented method of claim 1, wherein the augmentation model comprises a prediction model, a blend model, and an occlusion model, and wherein processing the input image and the contextual attention output with the augmentation model comprises:

processing, by the computing system, the input image with the prediction model to generate the predicted contextual attention data;

processing, by the computing system, the predicted contextual attention data and the contextual attention output with a blend model to generate the blended data;

processing, by the computing system, the blended data and the input image to generate the prediction image.

3. The computer-implemented method of claim 2, wherein the blend model is trained to randomly blend the predicted contextual attention data and the contextual attention output.

4. The computer-implemented method of claim 1, wherein the input image is generated by adding one or more occlusions to the ground truth image.

5. The computer-implemented method of claim 1, wherein the contextual attention model comprises a convolutional neural network and one or more contextual attention blocks.

6. The computer-implemented method of claim 1, wherein the contextual attention model is trained by:

processing, by the computing system, one or more training images with the contextual attention model to generate training contextual attention outputs;

processing, by the computing system, the training contextual attention outputs with an inpainting model to generate a training augmented image;

evaluating, by the computing system, a training loss function that evaluates a difference between the training augmented image and the ground truth image; and adjusting, by the computing system, one or more contextual attention parameters of the contextual attention model based at least in part on the training loss function.

7. The computer-implemented method of claim 1, further comprising:

receiving, by the computing system, one or more inputs descriptive of a selection of a portion of the input image; and wherein the prediction image is generated based at least in part on the one or more inputs.

* * * * *